US009596075B2

(12) United States Patent
Winslow et al.

(10) Patent No.: US 9,596,075 B2
(45) Date of Patent: Mar. 14, 2017

(54) TRANSPARENT SERIAL ENCRYPTION

(71) Applicant: L-3 Communications Corporation, New York, NY (US)

(72) Inventors: Richard Norman Winslow, Wilmington, DE (US); Todd David Heinrich, Garnet Valley, PA (US); Steven Daniel Devlin, Pitman, NJ (US); Frank Anthony Costantini, Woolwich Township, NJ (US)

(73) Assignee: L3 Technologies, Inc., New York, NY (US)

( * ) Notice: Subject to any disclaimer, the term of this patent is extended or adjusted under 35 U.S.C. 154(b) by 266 days.

(21) Appl. No.: 14/295,016

(22) Filed: Jun. 3, 2014

(65) Prior Publication Data

US 2016/0149696 A1 May 26, 2016

(51) Int. Cl.
*H04L 9/00* (2006.01)
*H04L 9/06* (2006.01)
*H04L 9/12* (2006.01)

(52) U.S. Cl.
CPC .............. *H04L 9/0618* (2013.01); *H04L 9/12* (2013.01); *H04L 2209/34* (2013.01)

(58) Field of Classification Search
CPC ... H04L 2209/24; H04L 9/065; H04L 9/0618; H04L 9/0662; H04L 9/28; H04L 63/061; G06F 12/1408; G06F 7/582
See application file for complete search history.

(56) References Cited

U.S. PATENT DOCUMENTS 5,341,426 A * 8/1994 Barney ..................... H04L 9/12
380/28
2007/0140477 A1* 6/2007 Wise .................. G06F 12/1408
380/28
2007/0237327 A1* 10/2007 Taylor .................. H04L 9/0662
380/37

* cited by examiner

*Primary Examiner* — Ghazal Shehni
(74) *Attorney, Agent, or Firm* — Condo Roccia Koptiw LLP

(57) ABSTRACT

Disclosed herein are methods and systems for configuring and using one or more block ciphering techniques in order to encrypt/decrypt serial data streams while maintaining cryptographic synchronization and attempting to minimize the amount of overhead introduced into the stream. The techniques disclosed herein may be used to encrypt and decrypt serial data streams using a block cipher in a manner that can be substantially transparent to the devices involved in the serial communication session. For example, the serial user data may be left unframed by the encryption device while monitoring for opportunistic times to transmit framed cryptographic synchronization information during periods of relative inactivity in an asynchronous serial data stream. A cryptographic device implementing the techniques described herein may be configured to implement one or more of an encryption device or a decryption device.

20 Claims, 9 Drawing Sheets

| Data / Action | RS 602 | Rx 604 | 8 Byte Shift Register 606 | | | | | | | | Tx 608 |
|---|---|---|---|---|---|---|---|---|---|---|---|
| | | | 1 | 2 | 3 | 4 | 5 | 6 | 7 | 8 | |
| 8th Idle – Insert CSynch | | CRC | | | | | ESC3 | ESC2 | ESC1 | Ux | Ux |
| 1st User Byte | 1.1 | U1 | Idle | Idle | Idle | Idle | Idle | Idle | Idle | Idle | Idle |
| 2nd User Byte | 1.2 | U2 | U1 | Idle | Idle | Idle | Idle | Idle | Idle | Idle | Idle |
| 3rd User Byte | 1.3 | U3 | U2 | U1 | Idle | Idle | Idle | Idle | Idle | Idle | Idle |
| 4th User Byte | 1.4 | U4 | U3 | U2 | U1 | Idle | Idle | Idle | Idle | Idle | Idle |
| 5th User Byte | 1.5 | U5 | U4 | U3 | U2 | U1 | Idle | Idle | Idle | Idle | Idle |
| 6th User Byte | 1.6 | U6 | U5 | U4 | U3 | U2 | U1 | Idle | Idle | Idle | Idle |
| 1st Idle Byte | | Idle | U6 | U5 | U4 | U3 | U2 | U1 | Idle | Idle | Idle |
| 2nd Idle Byte | | Idle | Idle | U6 | U5 | U4 | U3 | U2 | U1 | Idle | Idle |
| 3rd Idle Byte | | Idle | Idle | Idle | U6 | U5 | U4 | U3 | U2 | U1 | Idle |
| 4th Idle Byte | | Idle | Idle | Idle | Idle | U6 | U5 | U4 | U3 | U2 | U1 |
| 5th Idle Byte | | Idle | Idle | Idle | Idle | Idle | U6 | U5 | U4 | U3 | U2 |
| 6th Idle Byte | | Idle | Idle | Idle | Idle | Idle | Idle | U6 | U5 | U4 | U3 |
| 7th Idle Byte | | Idle | Idle | Idle | Idle | Idle | Idle | Idle | U6 | U5 | U4 |
| 8th Idle - Insert CSynch | | CRC | | | | | ESC3 | ESC2 | ESC1 | U6 | U5 |
| 1st User Byte | 2.1 | U1 | CRC | | | | | ESC3 | ESC2 | ESC1 | U6 |
| 2nd User Byte | 2.2 | U2 | U1 | CRC | | | | | ESC3 | ESC2 | ESC1 |
| 3rd User Byte | 2.3 | U3 | U2 | U1 | CRC | | | | | ESC3 | ESC2 |
| 4th User Byte | 2.4 | U4 | U3 | U2 | U1 | CRC | | | | | ESC3 |
| 5th User Byte | 2.5 | U5 | U4 | U3 | U2 | U1 | CRC | | | | |
| 6th User Byte | 2.6 | U6 | U5 | U4 | U3 | U2 | U1 | CRC | | | |
| 1st Idle Byte | | Idle | U6 | U5 | U4 | U3 | U2 | U1 | CRC | | |
| 2nd Idle Byte | | Idle | Idle | U6 | U5 | U4 | U3 | U2 | U1 | CRC | |
| 3rd Idle Byte | | Idle | Idle | Idle | U6 | U5 | U4 | U3 | U2 | U1 | CRC |
| 7th User Byte – No CSynch | 2.7 | U7 | Idle | Idle | Idle | U6 | U5 | U4 | U3 | U2 | U1 |
| 8th User Byte | 2.8 | U8 | U7 | Idle | Idle | Idle | U6 | U5 | U4 | U3 | U2 |
| 9th User Byte | 2.9 | U9 | U8 | U7 | Idle | Idle | Idle | U6 | U5 | U4 | U3 |
| 10th User Byte | 2.10 | U10 | U9 | U8 | U7 | Idle | Idle | Idle | U6 | U5 | U4 |
| 11th User Byte | 2.11 | U11 | U10 | U9 | U8 | U7 | Idle | Idle | Idle | U6 | U5 |
| 12th User Byte | 2.12 | U12 | U11 | U10 | U9 | U8 | U7 | Idle | Idle | Idle | U6 |
| 1st Idle Byte | | Idle | U12 | U11 | U10 | U9 | U8 | U7 | Idle | Idle | Idle |
| <Idles and 4 User Bytes> | | | | | | | | | | | |
| 17th User Byte | 3.1 | U17 | U16 | U15 | U14 | U13 | U12 | U11 | U10 | U9 | U8 |
| <Seven idles here> | | | | | | | | | | | |
| 8th Idle - Insert CSynch | | CRC | | | | | ESC3 | ESC2 | ESC1 | U17 | U16 |

TRANSPARENT SERIAL ENCRYPTION

BACKGROUND

In order to prevent data from being intercepted by unintended recipients, encryption is often used in order to encode messages or information in such a way that unauthorized parties are unable to access the data even while it is traversing unsecured networks such as the Internet. In typical encryption schemes, the unencrypted messages or information, referred to as plaintext, is encrypted using an encryption algorithm, transforming the plaintext data into an unreadable (e.g., to unintended recipients) ciphertext. Encryption is typically performed with the use of an encryption key, which is used to encode the messages in such a way that it practically unreasonable (e.g., in some case practically impossible) to decode the messages without additional information such as knowledge of the encryption key or other information detailing how the information was encoded. For example, an adversary that accesses the ciphertext should be unable to determine anything about the original plaintext message without access to a decryption key. An authorized party, however, is able to decode the ciphertext using a decryption algorithm that usually requires a secret decryption key that adversaries do not have access to. Depending on the type of encryption/decryption algorithms being used, the encryption and decryption keys may be the same (e.g., symmetric key cryptography) or different (e.g., asymmetric key cryptography).

Different types of encryption/decryption techniques may be used depending on the type of data to be protected. For example, serial communication systems may be characterized by sending data sequentially over a communication channel or computer bus. When serial communication is used, the communicated data is typically sent and received in a predetermined sequence or order, and out-of-sequence delivery can adversely affect the ability of the receiver to properly reconstruct the transmitted data. Examples of serial communication systems include RS-232 (e.g., a personal computer serial port), RS-422, RS-423, RS-485, Serial Peripheral Interface (SPI), Universal Serial Bus (USB), FireWire, Ethernet, Peripheral Component Interconnect (PCI), PCI Express, Synchronous Optical Networking (SONET), Synchronous Digital Hierarchy (SDH), MIL-STD-1553, etc.

Traditionally, serial data has often been encrypted/decrypted using stream cryptography such as a stream cipher. A stream cipher may be an example of a symmetric key cipher where plaintext digits are combined with a pseudo-random cipher digit stream (e.g., a keystream). In a stream cipher each plaintext digit may be encrypted in sequence with the corresponding digit of the keystream, to produce a digit of the ciphertext stream. Stream ciphers may also be referred to as a state cipher, as the encryption of each digit is dependent on the current state of the encryptor. In practice, a digit is typically a bit and the combining operation is often an exclusive-or (XOR) digital operation. The pseudorandom keystream is typically generated serially from a random seed value, for example using digital shift registers. The seed value may also serve as the cryptographic key for decrypting the ciphertext stream.

Block ciphers represent a different approach to encryption than stream ciphers. Block ciphers typically operate on large blocks of digits with a fixed, unvarying transformation. For example, a block cipher may be implemented using a deterministic algorithm operating on fixed-length groups of bits (e.g., blocks) with an unvarying transformation that is specified by a secret key (e.g., a symmetric key). Many modern encryption protocols such as the Advanced Encryption Standard (AES), Blowfish, RC5, International Data Encryption Algorithm (IDEA), etc. are examples of block ciphers.

Over the last few decades there has been a shift in communications from serial streams of data to packetized flows of data. For example, prior to the mid-1990s, most computers used dial-up networking over analog modems to reach the Internet over the Public Switched Telephone Networks (PSTNs). The flow of data through an analog modem is an example of a serial stream. Since then, most networking systems have switched to frame based flows such as Ethernet, Wi-Fi, or 3G/4G cellular communications. Due to the proliferation of packetized communication in recent decades, block ciphers have become increasingly prevalent and are more widely used than stream ciphers, especially in systems using packetized communication such as the Internet. This has caused the focus of the research of the majority of cryptographic algorithm developers to shift from algorithms that process data streams (e.g., stream cryptography) to algorithms that process data packets (e.g., block cryptography).

As a result, many existing stream algorithms have not been updated or have even been declared obsolete, but also have not been replaced. However, new and improved block algorithms are still active areas of research and development. In response to the shift from stream to block encryption, workarounds have been introduced that attempt to adapt block algorithms to process stream data; however, these workarounds often introduce additional overhead due to the framing of the stream data. Further overhead may also be generated due to the inclusion of crypto synchronization data in the encrypted stream. In addition, many existing workarounds can seriously degrade Radio Frequency (RF) link performance in the presence of noise, as even small errors in the transmitted ciphertext, user data framing, or Cryptosync data can result in error propagation during the decoding process, distorting entire blocks or even entire frames of data at the receiver. For this reason there has been wide resistance among users of radio frequency links, for example tactical data links, to implement modern block ciphering.

SUMMARY

Disclosed herein are methods and systems for configuring and using one or more block ciphering techniques in order to encrypt/decrypt serial data streams while maintaining cryptographic synchronization and attempting to minimize the amount of overhead introduced into the stream. The techniques disclosed herein may be used to encrypt and decrypt serial data streams using a block cipher in a manner that can be substantially transparent to the devices involved in the serial communication session. For example, the serial user data may be left unframed by the encryption device while monitoring for opportunistic times to transmit framed cryptographic synchronization information during periods of relative inactivity in an asynchronous serial data stream. A cryptographic device implementing the techniques described herein may be configured to implement one or more of an encryption device or a decryption device.

For example, an encryption device may be configured to receive a serial data stream. The encryption device may generate a keystream using a block cipher operating in counter mode. The keystream may be generated based on at least a key value and a count value. The encryption device may encrypt the serial data stream using the keystream. The encryption device may be configured to insert a framed cryptographic synchronization message into the encrypted serial data stream. The framed cryptographic synchronization message may include an escape sequence and an indication of a count value to be used to generate keystream data. The encryption device may output the encrypted serial data and the framed cryptographic synchronization message. The encryption device may also include an authentication field such as a checksum or cyclic redundancy check (CRC) determined based on the indication of the count value in the framed cryptographic synchronization message By opportunistically inserting the framed cryptographic synchronization message into the encrypted serial stream, a block cipher may be used without adding data framing information to the serial data included in the serial data stream, which may save significant overhead. For example, the encryption device may be configured to determine that an idle period in the serial data stream is sufficiently large to accommodate the framed cryptographic synchronization message. The encryption device may then insert the framed cryptographic synchronization message into the encrypted serial data stream at a position corresponding to the idle period. In order to determine whether there is a sufficiently large idle period, the encryption device may maintain a shift register with a length that is greater than or equal to a length of the framed cryptographic synchronization message. The encryption device may cycle units (e.g., bytes) of the encrypted serial data stream through the shift register. If the encryption device determines that the shift register has sufficient space available for the framed cryptographic synchronization message due to idle periods in the encrypted serial data stream, the encryption device may insert the framed cryptographic synchronization message into the encrypted serial data stream.

In order to provide transparent encryption/decryption to the serial communication devices involved in the serial communication session, the encryption device may be configured to maintain a relative timing of data within the serial data stream when encrypting the serial data stream and when inserting the framed cryptographic synchronization message. Although a delay may be introduced into the serial transmission due to buffering, encryption/decryption, and other processing, the delay may be substantially constant across the transmitted serial data stream, thus maintaining the same relative timing of the serial messages within the serial data stream. If the relative timing of the serial messages does not have to be maintained, then the encryption device may be configured to adjust the relative timing of one or more portions of the encrypted serial data stream in order to accommodate insertion of the framed cryptographic synchronization message.

In order to provide cryptographic synchronization data to a decryptor as often as practical such that the count synchronization can be maintained, the encryption device may be configured to insert an instance of framed cryptographic synchronization data into the encrypted serial data stream at the first opportunity where: there is sufficient idle space is available in the encrypted serial data stream to accommodate the instance of the frame cryptographic synchronization data after a preceding count value has been used to encrypt at least one serial data instance using keystream data generated from a previous count value. Excess keystream generated from the previous count value may be discarded upon incrementing the count value and sending a framed cryptographic synchronization message indicating the incremented count value. The encryption device may be configured to ensure that the escape sequence does not occur in the encrypted serial data stream unless the escape sequence is indicating the presence of an instance of a framed cryptographic synchronization message.

A cryptographic device may include a decryption device. For example, the decryption device may be configured to receive an encrypted serial data stream. One or more instances of a framed cryptographic synchronization messages may be included within the encrypted serial data stream. The decryption device may detect an escape sequence within the encrypted serial data stream. The decryption device may determine a count value based on detecting the escape sequence. The decryption device may generate a keystream using a block cipher operating in counter mode. The keystream may be generated based on at least a key value and the count value. The decryption device may decrypt at least a portion of the encrypted serial data stream using the keystream. The decryption device may output an unencrypted serial data stream that corresponds to at least a portion of the encrypted serial data stream.

As an example, the block cipher may be configured to implement the Advanced Encryption Standard (AES). The block cipher may generate the keystream based on a nonce value that is appended to the count value. The decryption device may be configured to decrypt the encrypted serial data stream using the keystream by XORing the encrypted serial data stream with data from the keystream.

In addition to updating the count value used for generating keystream data based on received a framed cryptographic synchronization message, the decryption device may also independently update the count value based on counting the amount of ciphertext data that has been decrypted using keystream generated with a given count value. For example, the decryption device may determine that all of the keystream data generated based on a given count value has been used to decrypt data. The decryption device may then increment the count value based on determining that all of the keystream data generated based on the given count value has been used to decrypt data. The decryption device may then generate additional keystream data using the block cipher based on the key value and the incremented count value. The decryption device may then decrypt subsequent serial data based using the additional keystream.

The count value and the escape sequence may be included in a framed cryptographic synchronization message embedded within the encrypted serial data stream. The framed cryptographic synchronization message may also include an authentication field such as a cyclic redundancy check (CRC). For example, the decryption device may be configured to validate the framed cryptographic synchronization message based on the CRC included in the authentication field. The cryptographic device, which may include one or more of an encryption device or a decryption device, may be implemented on a programmable logic device such as a field programmable gate array (FPGA). The cryptographic device may be implemented using a relatively small size, weight, and power (SWaP) footprint. For example, the cryptographic device may be configured to provide a traffic throughput of at least 10 Mb/sec while consuming 300 mW or less power and while weighing 20 grams or less.

BRIEF DESCRIPTION OF THE DRAWINGS

FIG. 6 illustrates an example of how cryptographic synchronization data may be inserted into asynchronous serial data to be encrypted and transmitted.

FIGS. 7A, 7B, & 7C illustrates examples of how serial data can be manipulated in order to accommodate cryptographic synchronization data.

DETAILED DESCRIPTION

Although many modern communications systems are transitioning towards the use of framed or packetized data transmission, many legacy systems and even some newer systems for certain applications (e.g., large data transfers, internal bus connections, interfaces to integrated circuits, certain RF applications, etc.) utilize serial communications. In order to communicate serial data in an encrypted manner while utilizing modern, advanced block ciphers, disclosed herein are techniques and systems for encrypting and decrypting synchronous and/or asynchronous serial communications using block ciphers while minimizing framing and other overhead such as cryptographic synchronization data.

Figure 1:
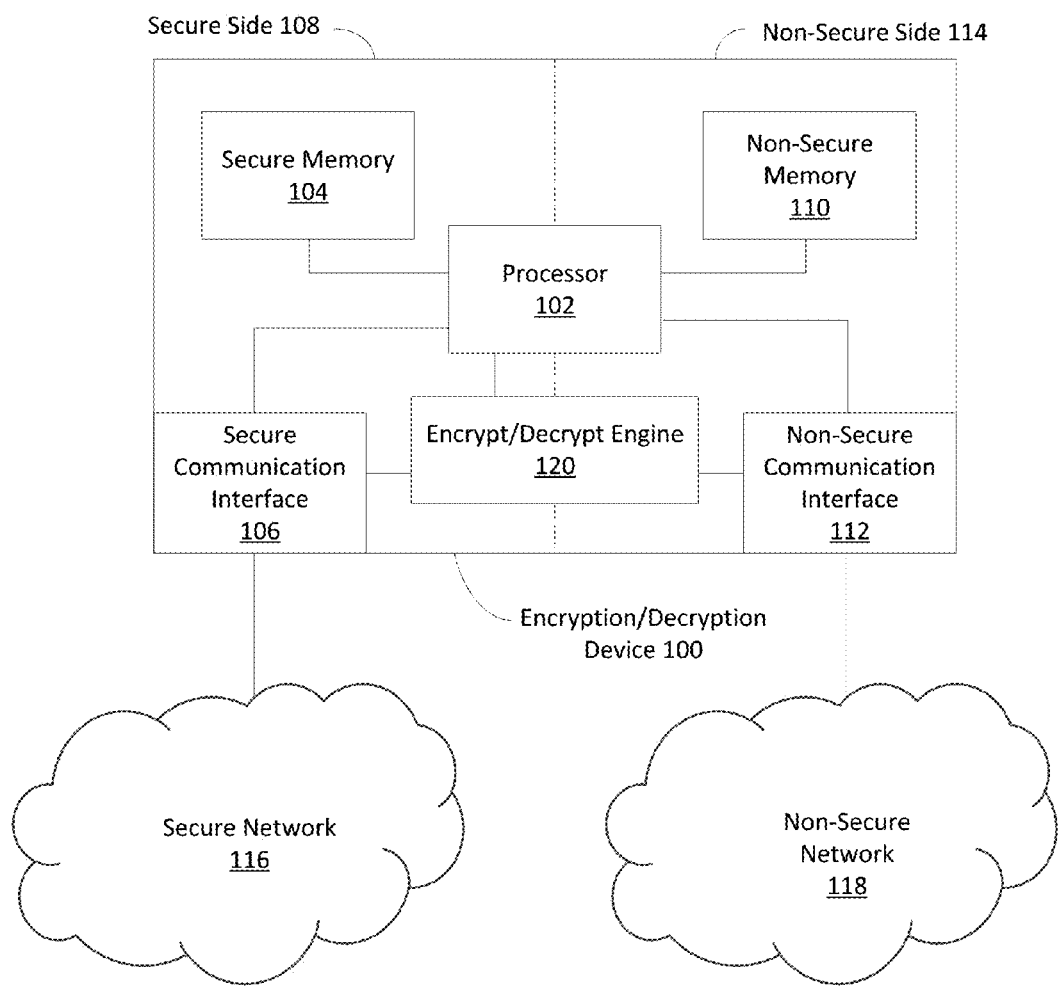
FIG. 1 is a block diagram of an example encryption/decryption (E/D) device.

FIG. 1 is a block diagram of an example of an encryption/decryption (E/D) device (e.g., may also be referred to as a cryptographic device). E/D Device 100 may be any device capable of encryption and/or decryption. E/D Device 100 may have one or more communication interfaces. E/D Device 100 may include processor 102. The processor 102 may demarcate an interface between a Secure Side 108 of E/D Device 100 and a Non-Secure Side 114 of E/D Device 100. User data or other sensitive information may be in an encrypted form when stored or communicated on Non-Secure Side 114. The encrypted data may be ciphertext (CT) data, and Non-Secure Side 114 may also be referred to as the CT side. Non-Secure Side 114 may also be known as a Black Side of E/D Device 100. Data stored or communicated on Secure Side 108 may be unencrypted. The unencrypted data may also be referred to as plaintext (PT) data, and Secure Side 108 may also be referred to as the PT side. Secure Side 108 may also be known as a Red Side of E/D Device 100. Although example internal components of E/D Device 100 are shown in FIG. 1 for purposes of illustration, E/D Device 100 may have a variety of internal configurations and may include more or less internal components then those shown in FIG. 1.

Processor 102 may be a general purpose central processing unit (CPU), a digital signal processor, a microcontroller, or the like. Processor 102 may be implemented in various ways, for example using fixed or field programmable gate logic. Processor 102 may include one or more Field Programmable Gate Arrays (FPGAs), which may be configured to perform one or more of the processes disclosed herein. For example, Processor 102 may perform encryption and/or decryption. Processor 102 may provide communication routing functions. In another example, multiple processors may be utilized. A dedicated module, engine, or device, for example Encrypt/Decrypt Engine 120, may perform encryption and/or decryption, while Processor 102 may perform other functions. Encrypt/Decrypt Engine 120 may be a separate processor, or a logical division of Processor 102. For example, data being communicated from Secure Side 108 to Non-Secure Side 114 may be encrypted by Processor 102.

Similarly, data being communicated from Non-Secure Side 114 to Secure Side 108 may be decrypted by Processor 102. In another example, a module within Processor 102 and/or a separate functional block within E/D Device 100, such as Encrypt/Decrypt Engine 120, may perform the encryption and/or decryption. E/D Device 100 may be configured to support Type 1 encryption. For example, E/D Device 100 may be configured to support communication via the HAIPE® protocol. E/D Device 100 may be configured to perform symmetric encryption (e.g., uses the same key to encrypt and decrypt), asymmetric encryption (e.g., uses different keys to encrypt and decrypt), public-key encryption (e.g., the publicly known key is used to encrypt and a private key is used to decrypt), manual encryption (e.g., user input may be utilized), transparent encryption (e.g., user input is not utilized), and/or the like. Encryption may be performed on serial data using block ciphers algorithms such as the Advanced Encryption Standard (AES). E/D Device 100 may be configured to perform key establishment and/or discovery, for example communicating via Non-Secure Communication Interface 112 over Non-Secure Network 118.

Secure Side 108 may include Secure Memory 104 and/or Secure Communication Interface 106. Secure memory 104 may be a tangible computer-readable memory, for example semiconductor or solid state memory, magnetic tape, a removable computer diskette, a random access memory (RAM), a read-only memory (ROM), a rigid magnetic disk, an optical disk, a hard drive, and/or a Redundant Array of Independent Disks (RAID). Processor 102 may be configured to execute instructions stored on Secure Memory 104. Processor 102 may store data on Secure Memory 104, for example unencrypted, PT data, and/or may read data from Secure Memory 104.

Processor 102 may communicate with Secure Network 116 via Secure Communication Interface 106. Secure Network 116 may be a trusted network. Data communicated over Secure Network 116 may be in an unencrypted form. Secure Network 116 may include multiple secure subnets. The secure subnets may be a logical division of Secure Network 116. For example, computers communicating locally via network switch or router may be located on the same subnet of Secure Network 116. For example, secure routers included in Secure Network 116 may form the logical demarcation between a plurality of subnets within Secure Network 116. Serial communication may be performed over Secure Network 116.

Secure Communication Interface 106 may be any interface capable of communication with Secure Network 116. Secure Communication Interface 106 may include one or more of a network adapter, a serial communication adapter, and/or other type(s) of communication device(s), for example depending on the communication protocol utilized by Secure Network 116. Example network adapters may include cable modems, dial-up modems, wireless network adapters, Ethernet adapters, Ethernet Network Interface Cards (NICs), serial network adapters, and the like. A serial network adapter may communicate using one or more of RS-232, USB, FireWire, and/or the like. If Secure Communication Interface 106 is capable of packetized communications, then the Secure Communication Interface 106 may be associated with an IP address and a MAC address. For example, the IP address for Secure Communication Interface 106 may be referred to as the PT IP address for E/D Device 100. Secure Communication Interface 106 may be adapted to perform point-to-point communication and/or network-based communication.

Processor 102 may communicate with Non-Secure Network 118 via Non-Secure Communication Interface 112. Non-Secure Network 118 may be a public network. For example, Non-Secure Network 118 may be the Internet. Non-Secure Network 118 may include a wireless data link. Non-Secure Network 118 may be vulnerable to snooping or other attacks. Data communicated over Non-Secure Network 118 may be in an encrypted form. Non-Secure Network 118 may be used to communicate with other secure networks or secured devices. For example, encrypted messages may be sent to other devices over Non-Secure Network 118 via Non-Secure Communication Interface 112. Non-Secure Communication Interface 112 may be any interface capable of communication with Non-Secure Network 118.

Non-Secure Communication Interface 112 may include one or more of a network adapter, a serial communication adapter, and/or other type(s) of communication device(s), for example depending on the communication protocol utilized by Non-Secure Network 118. Example network adapters may include cable modems, dial-up modems, wireless network adapters, Ethernet adapters, Ethernet Network Interface Cards (NICs), and the like. A serial network adapter may communicate using one or more of RS-232, USB, FireWire, and/or the like. If Secure Communication Interface 112 is capable of packetized communications, then the Secure Communication Interface 112 may be associated with an IP address and a MAC address. For example, the IP address for Non-Secure Communication Interface 112 may be referred to as the CT IP address for E/D Device 100. Non-Secure Communication Interface 112 may be adapted to perform point-to-point communication and/or network-based communication.

As noted above, an E/D device may be configured to use various types of key-based encryption in order to encrypt plaintext data into ciphertext data for transmission. Similarly, an E/D device may be configured to use key-based decryption in order to decrypt ciphertext data to derive plaintext data. In order to establish one or more keys that may be used to perform encryption and/or decryption, a control plane for the cryptographic system may configure the encryption/decryption module for operation. As the level of trust associated with the communication session may be dependent on the identity of one or more of the keys being kept a secret, techniques may be specified for generating session keys and/or otherwise protecting a secret key from being compromised in a fashion that may jeopardize an encrypted communication session.

For example, cryptographic devices to be deployed on UAVs and other devices that may be of relatively small size and/or that may supply relatively little power may be faced with many constraints that may not encountered when designing traditional cryptographic devices. For example, a cryptographic device with a lower Size, Weight, and Power (SWaP) footprint that still achieves a relatively high data throughput may be achieved by using an embeddable cryptographic module that may omit one or more user/manager interfaces used to configure the device and instead may utilize auxiliary configuration equipment in order to establish cryptographic parameters, load cryptographic keys, and/or otherwise configure the cryptographic module for operation. Further, although session key(s) used by the embeddable cryptographic device may be stored locally, by using auxiliary configuration equipment to program the embeddable cryptographic module with the session keys, long-term, highly sensitive secrets (e.g., an secret key used to generate a session key) may be stored in the auxiliary configuration equipment rather than in the embeddable cryptographic device. In this manner, the embeddable cryptographic device may be constructed without the use of anti-tamper protection (e.g., which may include relatively large and/or heavy hardware components), allowing the device to be produced in low SWaP packaging. Similarly, by storing the sensitive long-term secrets outside of the embedded module, fail-safe attributes associated with cryptographic key management (e.g., which may be implemented in hardware) may be performed in the auxiliary configuration equipment rather than the embeddable cryptographic module, further allowing the embeddable cryptographic module to maintain a relatively small SWaP profile. The embeddable cryptographic device may be used to encrypt and/or decrypt serial data using one or more block cipher techniques.

In order to use an embeddable cryptographic device with a relatively small SWaP profile for encrypting/decrypting user data while still providing adequate levels of assurance that the data being encrypted is protected, the data plane related functions (e.g., encryption, decryption, etc.) of the cryptographic device may be separated from the control plane functions (e.g., key management functions such as fail-safe key management functions). In this manner, the data plane functionality may be implemented on a lightweight, low-power embeddable integrated circuit (e.g., such as a field-programmable gate array (FPGA)), while the control plane related functions may be implemented in a larger, tamper-proof configuration device so that sensitive long-term secrets may be assured adequate levels of protection. The configuration device may include a user interface that may allow the user to configure one or more embeddable cryptographic devices using the control plane included in the configuration device. The one or more embeddable cryptographic modules may be configured for a cryptographic session using the configuration device, and then applied directly to the communication interface to be used for the cryptographic session.

In this manner, a full-service cryptographic module may be implemented as a composite system including a parent device (e.g., the configuration equipment including the control plane) and a child device (e.g., an embeddable cryptographic device in a low SWaP package). The parent device may store long-term sensitive secrets but may not be subject to low SWaP limitations since the parent device does not need to be located on the platform (e.g., UAV) for which the cryptographic session is being established. Instead, the child device may include information used to communicate during a cryptographic session (e.g., cryptographic key(s), cryptographic algorithm logic, etc.) while meeting the desired SWaP requirements. For example, such a separable configuration allows the entire low SWaP budget to be allocated for traffic processing in the child device, allowing for greater data throughput for a given SWaP. Further, the child device may be designed in such a way that additional reductions in SWaP may be achieved, for example by reducing the achievable throughput of the cryptographic module. Techniques for configuring a child cryptographic device are described in co-pending U.S. patent application Ser. No. 14/015,443, filed Aug. 30, 2013, and entitled CRYPTOGRAPHIC DEVICE WITH DETACHABLE DATA PLANES, the contents of which are hereby incorporated herein in its entirety.

As an example, many of the legacy communication systems on UAVs, aircraft, intelligent projectiles, ground vehicles, ships, submarines, unmanned underwater vehicles (UUVs), sensor stations (e.g., unattended sensors), etc. may be configured to utilize one or more serial communication buses and/or channels. These devices may be adapted to use a wide range of traffic interfaces, cryptographic modes, and data rates.

In order to protect this serial data during transmission over an unsecured network and/or in order to decrypt cryptographically encrypted serial data received from the unsecured network without modifications to the existing host and communications equipment, a cryptographic module using a block ciphers (e.g., such as AES) may be inserted or used in a serial communications data path. In an example, the cryptographic device and/or the encryption/decryption may be substantially transparent to the devices involved in the serial communication session. Since the encryption/decryption may be transparent to the devices involved in the serial communication session, the cryptographic techniques may be performed and the cryptographic module(s) may be instead into the serial communication path without re-configuring the source and/or destination devices for the serial data. In other words, in some examples that cryptographic device may serve as "black box" encryptor/decryptor in a serial communication path without having to re-configure to modify the operation of intervening communication equipment, the source device for the serial data, and/or the destination device for the serial data. The cryptographic device may be used with synchronous and/or asynchronous serial communication devices.

Additionally, the techniques described herein may also be used to minimize RF signal loss as compared to existing approaches for block cipher encryption of serial data. For example, the use of opportunistic transmission of cryptographic synchronization data may reduce or eliminate the number of errors propagated during data transmission. The techniques described herein may be used for one or more of Type 1 and/or non-Type 1 cryptographic applications.

In order to use a block cryptographic cipher such as AES to encrypt and/or decrypt a stream of serial user data (e.g., such as asynchronous serial data), the cryptographic device may be configured to utilize the idle times of the serial communication session to transmit framed cryptographic synchronization data. In an example, the framed cryptographic synchronization data may be transmitted without the use of a frame structure for the user data being communicated in the serial data session. This may be different than traditional block cipher implementations, which typically operate on framed user data. For example, "framing" data or "framed" user data may refer to a digital data transmission unit that includes frame synchronization (e.g., a sequence of bits or symbols that allow a receiver to unambiguously detect the beginning and end of the packet in the stream of symbols or bits). Thus, if a receiver of framed data is processing a framed transmission, the receiver may be configured to identify the frame synchronization information in the data stream (e.g., header information, flags, other indicators of logical divisions), in order to determine the user data that corresponds to a given framed transmission. Once the beginning and end of a framed transmission has been identified, the receiver can take further steps to process or operate on the user data, for examples such as applying encryption and/or decryption techniques.

Serially communicated user data is typically characterized by a lack of frame synchronization (e.g., the serial data does not include headers or other overhead that separates user data in such a way that the divisions may be unambiguously determined at the receiver). Although the introduction of such framing could be performed for serial communications by inserting frame synchronization overhead into the serial data stream, such techniques can introduce relatively large amounts of additional overhead, reducing effective data rates and potentially creating circumstances where the source and/or destination serial communication devices may have to be modified in order to accommodate the introduction of the frame overhead.

For example, asynchronous serial data may be characterized by intermittent transmission of data where the length of a given transmission may vary greatly (e.g., by orders of magnitude). It can be difficult to frame such data as the serial data rate can be rather high, and the framing module may lack knowledge as to the length of any given asynchronous serial transmission. Further, when operating a high data rates with and transmitting a relatively continuous transmission, introducing additional framing overhead to the serial user data may cause the transmitted stream to be "interrupted" as seen from the perspective of the receiver due to the processing and transmission time associated with framing and deframing the data prior to delivery. Such techniques may lack transparency from the perspective of the receiver, as certain user data transmissions may experience shorter or longer delays than other user data transmissions. Typical serial communication devices may be adapted to expect a constant transmission delay for each of the transmissions from the source device.

In order to utilize a block cipher with synchronous and/or asynchronous serial data, methods and devices are described for applying frames to cryptographic synchronization data while allowing serial user data to be encrypted/decrypted and transmitted without being framed. The framed cryptographic synchronization data may be conveyed to the receiving cryptographic device to enable decryption at that device. In an example, the framed cryptographic synchronization data may be opportunistically inserted into a user data serial stream during idle periods of the user data serial stream. The opportunistic transmission of framed cryptographic synchronization data may preserve the original relative timing of user data messages (e.g., potentially with a constant, minimal buffering delay introduced during the encryption/decryption processing), thus allowing the encryption and decryption operations to appear transparent to the user equipment. Such techniques may allow for a transparent crypto stream encryption mode using modern block cipher algorithms.

Figure 2:
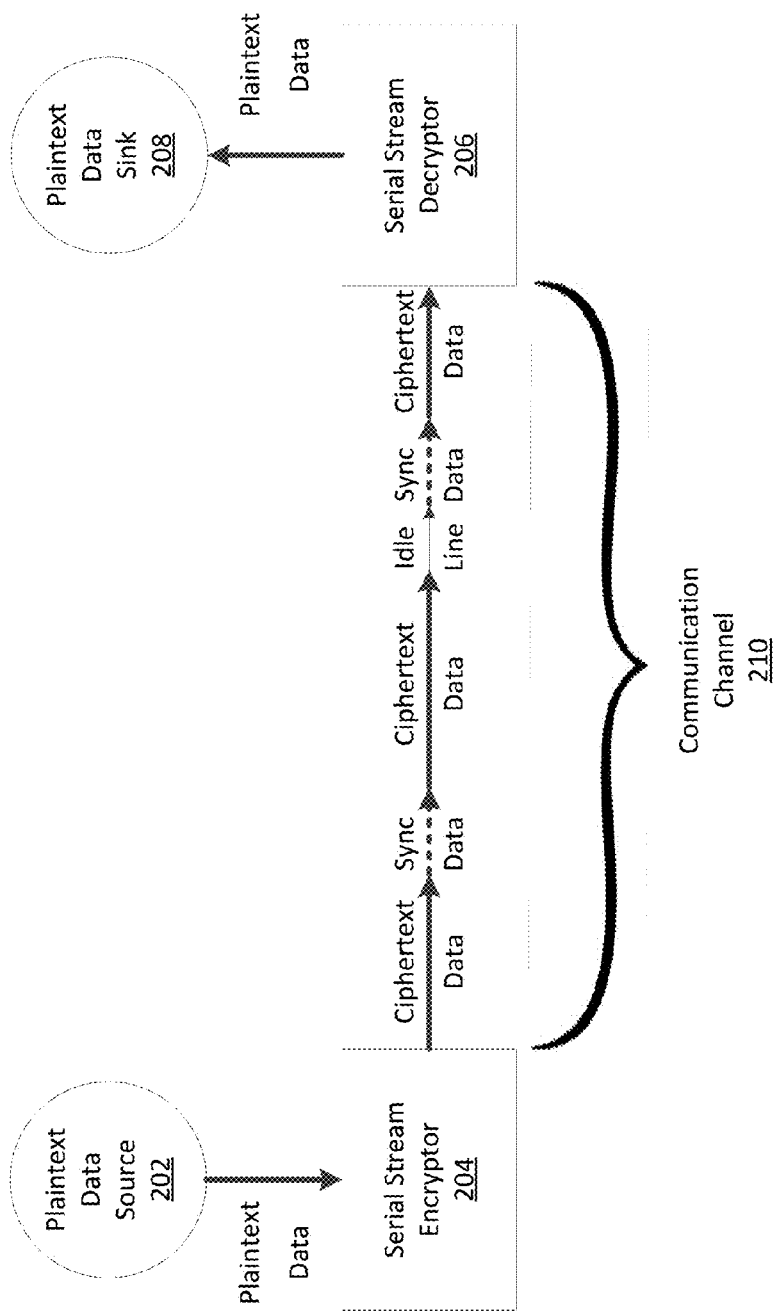
FIG. 2 is an example system diagram illustrating communications between a serial encryptor and a serial decryptor.

FIG. 2 illustrates an example system for the transmission of a serial data stream using a block cipher. For example, Plaintext Data Source 202 may be a source of serial data to be communicated. For example, Plaintext Data Source 202 may be a device that generates serial data to be transmitted to a destination serial device. The destination serial device may correspond to Plaintext Data Sink 208. As an example, plaintext data source 202 may be correspond to a sensor or processing device located on a vehicle such as a UAV. Plaintext Data Sink 208 may be a database or receiver device located at ground/mission control. For example, Plaintext Data Source 202 may correspond to data from a sensor or video feed from a UAV and the Plaintext Data Sink 208 may correspond to a database used for collecting the sensor or video data back at a ground station.

In order to transfer the serial data from Plaintext Data Source 202 to Plaintext Data Sink 208, the serial data may be communicated over Communication Channel 210. Communication channel 210 may include one or more wired and/or wireless communication link(s) (e.g., RF, cables, wires, buses, etc.). During transmission over Communication Channel 210, the transmitted data may be vulnerable to snooping or other interception by unintended targets. In order to prevent the data from being compromised due to interception, the serial data from Plaintext Data Source 202 may be encrypted prior to transmission over Communication Channel 210. For example, plaintext data may be provided to Serial Stream Encryptor 204 from Plaintext Data Source 202. Serial Stream Encryptor 204 may use one or more of the techniques described herein to encrypt the serial plaintext data from Plaintext Data Source 202 using a block cipher while opportunistically inserting framed cryptographic synchronization data into the serial data stream.

Thus, as shown in FIG. 2, during transmission over Communication Channel 210, the encrypted stream may include ciphertext data corresponding to an encrypted version of the plaintext data form Plaintext Data Source 202, sync data (e.g., framed cryptographic synchronization data inserted into the serial stream by Serial Stream Encryptor 204), and/or periods of idle time. As an example, Plaintext Data Source 202 may be a source of asynchronous serial data. As such, the serial data output from Plaintext Data Source 202 may be relatively random and/or may not occur with predetermined timing. Thus, at various instances of time, there may be user data available for transmission but at other instances Plaintext Data Source 202 may not have any data available for transmission (e.g., Plaintext Data Source 202 may be considered idle).

Serial Stream Encryptor 204 may be configured to detect such idle periods and insert framed cryptographic synchronization data into the serial data stream when a sufficient idle time is detected. For example, the plaintext data from Plaintext Data Source 202 may be formatted as variable length messages/data spurts and may arrive at Serial Stream Encryptor 204 one byte at a time in a specific order (e.g., although greater or less than one byte denominations of data may arrive at a given transmission instance depending on the configuration of the serial communication system generating the data). Serial Stream Encryptor 204 may be unaware of how much idle time is to occur after receiving a completed serial message from Plaintext Data Source 202 and before the arrival of the beginning of a next serial message from Plaintext Data Source 202. If Serial Stream Encryptor 204 does not ensure that encryption of a previous serial message and possible insertion of cryptographic synchronization data is completed before a subsequent serial message is to be transmitted, the possibility of one or more serial messages being lost can greatly increase as retransmissions are typically not utilized for serial communication links.

The Serial Stream Encryptor 204 may be configured to detect idle times between the transmissions of idle messages. If the idle time is sufficiently long, then Serial Encryptor 204 may be configured to insert framed cryptographic synchronization data into the serial stream for encryption and transmission. As an example, a framed cryptographic synchronization message may correspond to eight bytes of information (e.g., although different lengths of framed cryptographic synchronization data may be used depending on the application). For example, three bytes may be used as header information in order to unambiguously indicate to the receiver that the message corresponds to cryptographic synchronization data rather than user data bits that are part of the serial stream.

Further, four bytes may be used for the actual cryptographic synchronization data. For example, if Counter Mode AES is to be utilized for encrypting the serial data stream, the serial data may be encrypted in 128-bit (e.g., 16 byte) increments. However, other encryption block/keystream sizes may be used as well depending on the encryption/decryption configuration (e.g., 64-bit increments, 256-bit increments, etc.). When Counter Mode encryption/decryption is utilized, a counter may be used at the encryptor to count the number of blocks that have been encrypted. The current count value may be an input for encryption of a next logical data block. A similar counter may be maintained at the decryptor in order to properly decrypt the serial data (e.g., the count value maintained at the decryptor is used in order to decrypt the message). In order to ensure that the counter at the encryptor and the encounter at the decryptor remain synchronized (e.g., the count value that is used at the encryptor to encrypt a given word is the same count value used for decryption at the decryptor), the decryptor may be configured to intermittently transmit a refresh/synchronization message that indicates its current value for the count.

If Counter Mode AES is used for generating the keystream for encryption, then typically a 128-bit (e.g., 16 byte) counter may be used. However, in order to reduce overhead for transmission of cryptographic synchronization data, a fixed pattern may be used for the upper (e.g., most significant) 96 bits of the counter and the lower (e.g., least significant) 32 bits of the counter may be used for the cryptographic synchronization data. The 96-bit constant portion of the count value may be referred to as a nonce. In this manner, fewer cryptographic synchronization overhead bits are exchanged when transmitting over the data link and a shorter idle time can be used for transmitting the framed cryptographic synchronization message while still utilizing a full 128-bit count value for AES in counter mode. For example, the nonce (e.g., 96-bit constant portion of the count value) could be a 12 byte fixed ASCII pattern such as "GALAXY QUEST". However, other constant values may be used and in some examples the entire count value (e.g., 128 bit count value) could be included in the framed cryptographic synchronization message. The nonce and the current value of the counter may be input with a secret key to the AES algorithm in order to produce a key stream of length equal to the cryptographic block size of the cipher in use (e.g., the size of the count plus nonce value, which may or may not be the same length as the secret key). In order to generate more keystream bits, the counter may be incremented and the nonce and updated counter value may be re-input to the AES algorithm with the key value to produce additional keystream bits.

Thus, four bytes of the framed cryptographic synchronization message may be used for indicating the current value of the counter as used by the encryptor (e.g., and/or the four least significant bytes of the counter). In this manner, if the counters at the encryptor and decryptor become de-synchronized (e.g., one or more messages transmitted over the Communication Channel 210 are lost, resulting in the decryptor failing to receive and count a message that was properly counted at the encryptor), then Serial Stream Decryptor 206 may be unable to properly decrypt the user data. However, if a synchronization message is then received at the at Serial Stream Decryptor 206, then Serial Stream Decryptor 206 may then be able to resume properly decoding subsequent messages using the correct count value.

Thus, for an example using Counter Mode AES, four bytes of the framed cryptographic synchronization message may be reserved for indicating the current value of the counter as maintained by Serial Stream Encryptor 202. In order to provide error protection and/or to validate the framed cryptographic synchronization message, an authentication field may be included in the framed cryptographic synchronization message. For example, the authentication field may include a checksum or other error detection mechanism. As an example, an 8-bit (e.g., one byte) cyclic redundancy check (CRC) may be appended to the framed cryptographic synchronization message in order to check for bit errors. Additionally, since in this example a three byte header or escape sequence is used to unambiguously identify the message as a framed cryptographic synchronization message, the CRC may also be used to confirm to Serial Stream Decryptor that the three byte header is in fact an escape sequence for the framed cryptographic synchronization message and not encrypted user data that happens to match the escape sequence.

Thus, in an example, the framed cryptographic synchronization message may include a framing or escape sequence, an indication of the current count value at the encryptor, and authentication filed (e.g., a checksum) to validated the received message and/or to detect potential bit errors that occur during transmission of the framed cryptographic synchronization message. For an example implementation using Counter Mode AES, the framed cryptographic synchronization message may include a three byte escape sequence, a four byte counter value, and a one byte authentication field (e.g., a checksum, CRC, parity bit(s), etc.). The four byte counter value may correspond to the counter value (or a portion thereof) to be used for the next message to be transmitted.

In order to determine whether sufficient idle time is available for transmission of the cryptographic synchronization message, Serial Stream Encryptor 204 may maintain a shift register in order to buffer incoming serial user data. The shift register may have a size equal to the length of a framed cryptographic synchronization message. For example, if the framed cryptographic synchronization message has a length of eight bytes, an eight-byte shift register may be used. As serial data is received, the data may be inserted into the shift register, and each byte of data in the registered may be shifted to the next appropriate byte position when the data is transmitted. Examples of shift register operation may be described in more detail with respect to FIG. 6.

When the shift register becomes empty, Serial Stream Encryptor 204 may determine that sufficient idle time is available for transmission of the framed cryptographic synchronization message. For example, if an eight-byte framed cryptographic synchronization message is used, then when the eight-byte shift register is empty, the framed cryptographic synchronization message may be transmitted by Serial Stream Encryptor 204.

Serial Stream Decryptor 206 may receive the framed cryptographic synchronization message and may recognize the three-byte escape message as the framing information for the framed cryptographic synchronization message. Serial Stream Decryptor 206 may then extract the four-byte count value from the framed cryptographic synchronization message. Serial Stream Decryptor may check the one-byte checksum value to ensure that bit errors are not present in the framed cryptographic synchronization message and/or that the three-byte escape sequence does not correspond to ciphertext user data that happens to take the same value as the escape sequence. Serial Stream Decryptor 206 may then use the received counter value for performing a subsequent decryption of ciphertext user serial data (e.g., and incrementing the counter value as subsequent decryptions are performed).

Figure 3:
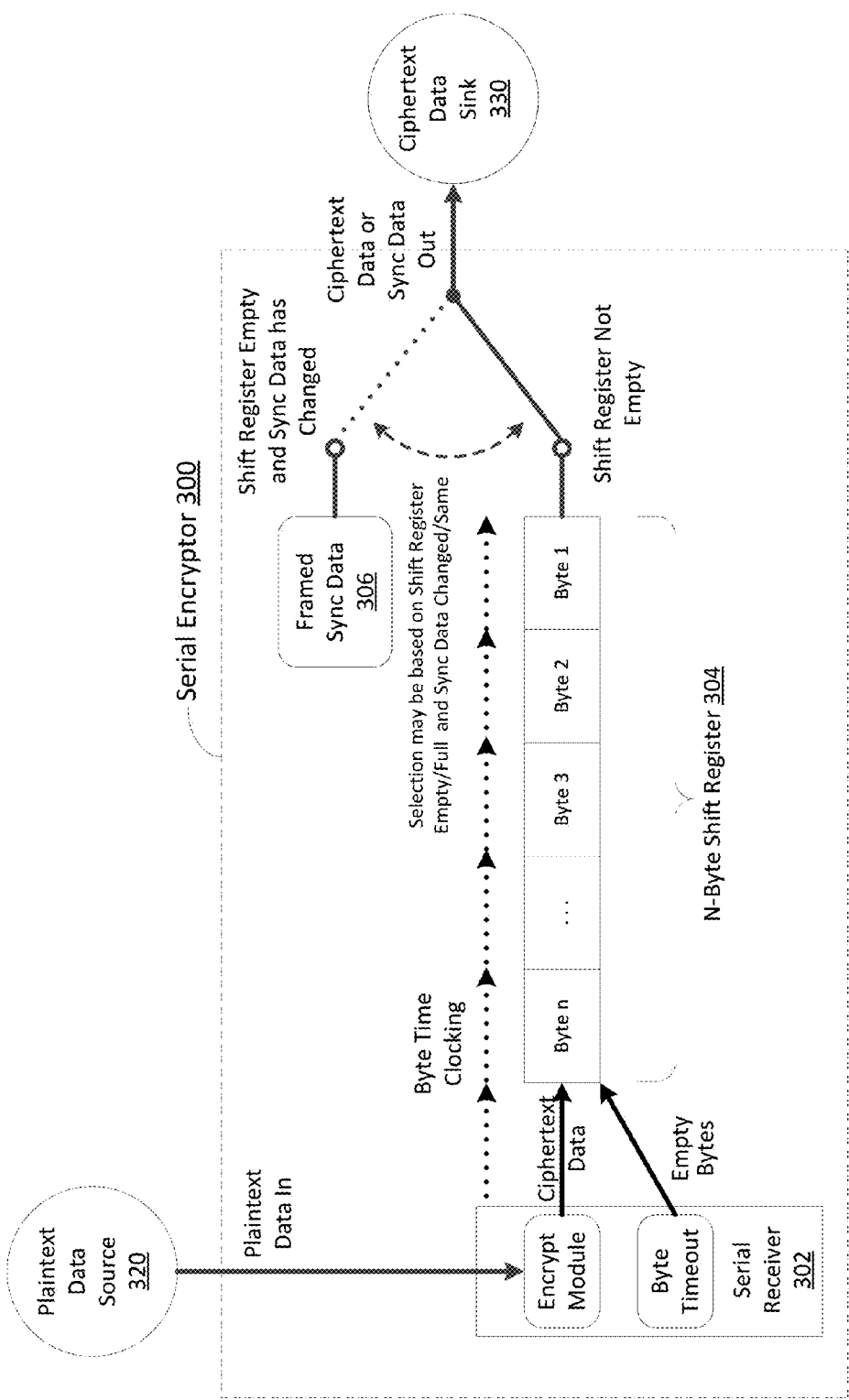
FIG. 3 is a functional block diagram of an example serial encryptor.

FIG. 3 is a block diagram illustrating an example serial encryptor that may be configured to encrypt serial data using a block cipher. For example, Serial Encryptor 300 may receive serial data from Plaintext Data Source 320. The plaintext data from Plaintext Data Source 320 may arrive as a serial stream at Serial Encryptor 300. The serial data stream may be in the form of bits, multi-bit symbols, 8-bit bytes, multi-byte words, longer message structures, and/or the like. For purposes of illustration and explanation, examples may be described in terms of bytes of data for consistency.

The plaintext user data from Plaintext Data Source 320 may be encrypted by Serial Encryptor 300 as it arrives at Serial Receiver 302. For example, a first byte of user data may be subject to an Exclusive-Or (XOR) operation with a byte of keystream from the block cipher. For example, the keystream may be produced by using AES in counter mode (e.g., CTR mode) to produce a stream cipher from the AES block cipher. The encrypted data byte may be storage in the Byte n position of N-Byte Shift Register 304. N-Byte Shift Register 304 may be a shift register that is the same length as or longer than the length of the framed synchronization data message. For example, if a three byte escape sequence, a four byte counter value, and a one byte checksum are used, then an 8-byte or greater shift register may be used. In an example, N-Byte Shift Register 304 may be selected to be the same size as the length of the framed cryptographic synchronization message in order to minimize the buffering delay incurred as the encrypted ciphertext data is shifted through the register.

The shift register may be cycled from Byte N to Byte 1 (e.g., from left to right in FIG. 3) once per input byte-time regardless of whether or not a user data byte was received during that period. When an encrypted ciphertext user data byte progresses to Byte 1 (e.g., the right side of N-Byte Shift Register 304), the ciphertext byte may be output from the ciphertext side of Encryptor 300 to be transmitted to the receiving cryptographic module. The receiving cryptographic module may correspond to Ciphertext Data Sink 330 in FIG. 3.

If no plaintext user data bytes are received by Serial Encryptor 300 from Plaintext Data Source 320 during N successive byte times (e.g., where N may be the length of the framed cryptographic synchronization message and/or the length of N-Byte Shift Register 304), then Encryptor 300 may instead output the framed cryptographic synchronization message (e.g., Framed Sync Data 306) during the corresponding N-byte time period. For example, if the framed cryptographic synchronization message is eight bytes long and Encryptor 300 does not receive new user data for eight consecutive byte time periods, then the eight byte framed cryptographic synchronization message may be transmitted. Thus, the framed cryptographic synchronization message may replace what would have been idle times in the serial data transmission. Outputting the framed cryptographic synchronization message during this idle period may render the insertion of the framed cryptographic synchronization message transparent to the user equipment generating and/or receiving the serial data. Although the same relative timing between serial messages is maintained, the use of the N-byte shift register may introduce an N-byte time delay into the transmission time.

Figure 4:
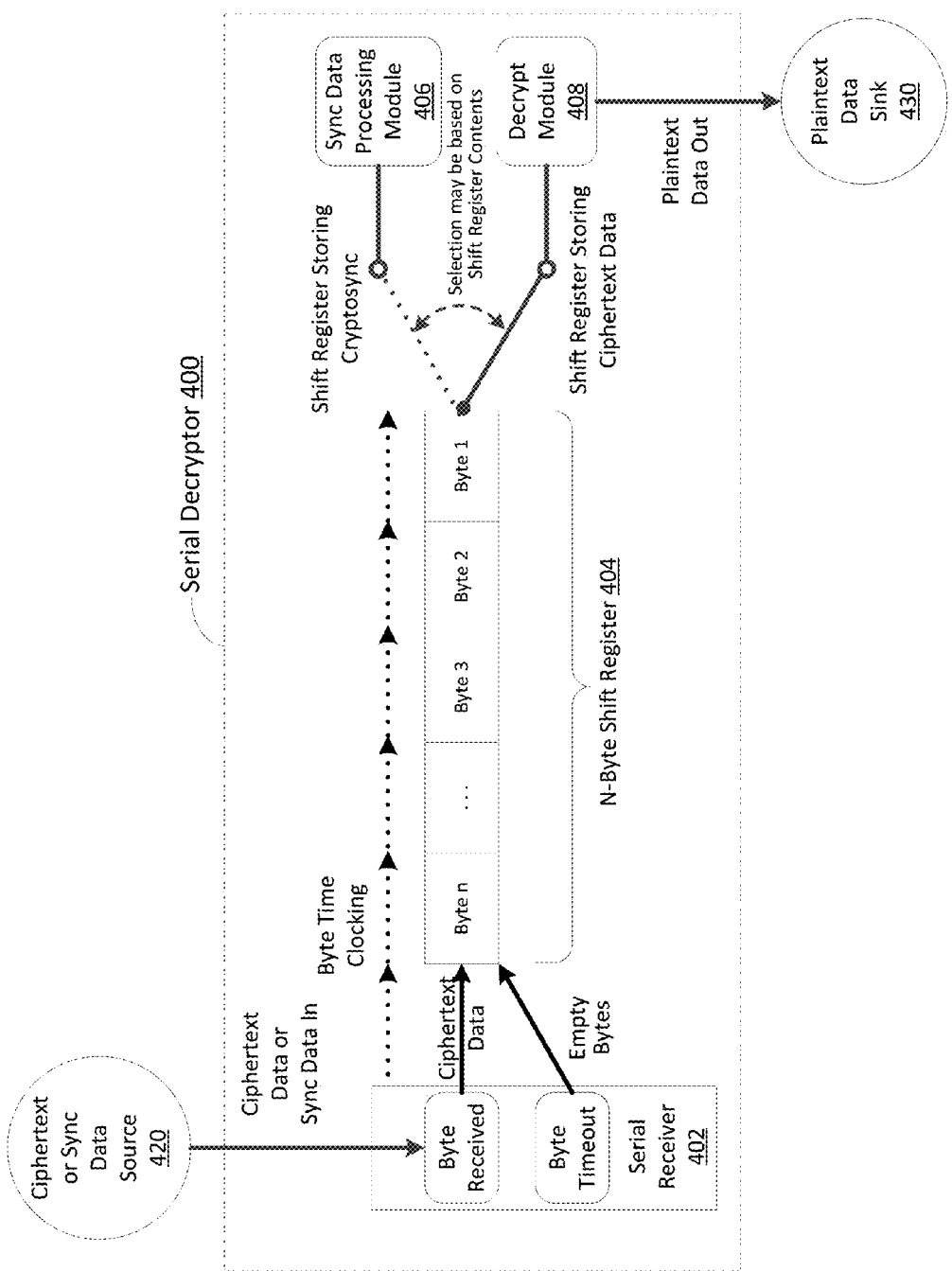
FIG. 4 is a functional block diagram of an example serial decryptor.

FIG. 4 illustrates an example decryptor of a serial data stream using a block cipher. For example, Serial Decryptor 400 may be configured to perform a decryption process that reverses the encryption and sync data insertion operation used by a serial encryptor, such as Serial Encryptor 300 for FIG. 3. Serial Decryptor 400 may include Serial Receiver 402, which may be configured to receive ciphertext user data and framed cryptographic synchronization data embedded within the ciphertext data stream. The source of the ciphertext data source may be represented as Ciphertext or Sync Data Source 402 in FIG. 4. For example, the source of the ciphertext data and framed cryptographic synchronization data may be a serial encryptor in operable communication with Serial Decryptor 400.

Since the received ciphertext user data may be an encrypted form of an asynchronous serial data stream, the relative timing of received message, the length of received messages, and/or the length of the silent time between messages may vary. As such, Serial Receiver 402 may monitor to communication channel to determine whether ciphertext data have been received or if the communication link is currently not being used for data transmission (e.g., a silent period). If during a given byte-time ciphertext data is received over the communication channel from Ciphertext or Sync Data Source 420, then the received data—which may correspond to encrypted user data or framed cryptographic synchronization data, may be inserted into N-Byte Shift Register 404. N-Byte Shift Register 404 may be designed so as to allow Serial Decryptor 400 to distinguish between ciphertext user data and framed cryptographic synchronization data.

For example, N-Byte Shift Register 404 may be used by the Serial Decryptor 400 to store received data to determine if framed cryptographic synchronization data is present. The Serial Decryptor 400 may be configured to recognize an instance of the escape sequence in the N-Byte Shift Register 404. As noted above, the escape sequence may be a predefined series of one or more bytes (e.g., or bits/multi-byte structures/words/etc. depending on the type and size of the framed cryptographic synchronization message) that unambiguously indicates that the presence of cryptographic synchronization data in the ciphertext data stream. The escape sequence may be used to frame the cryptographic synchronization data in order to allow Serial Decryptor 400 to determine which bytes correspond to the cryptographic synchronization data with N-Byte Shift Register 404.

When Serial Decryptor 400 determines that a given byte corresponds to an encrypted user data byte (e.g., a user data byte of ciphertext), the byte may be sent to Decrypt Module 408 for decryption in order to produce a corresponding plaintext data byte. For example, the ciphertext byte may be XOR'd with a byte of keystream from the block cipher. The same byte of keystream used to encrypt the byte a serial encryptor may also be used to decrypt the corresponding ciphertext byte at Serial Decryptor 400. In order to maintain synchronization between the bytes used for encryption at the serial encryptor and decryption at Serial Decryptor 400, the framed cryptographic synchronization data may be opportunistically inserted into the ciphertext stream. For example, if Counter Mode encryption/decryption, the cryptographic synchronization data may correspond to an indication of the count value that was last used to produce a byte of cryptographic keystream and/or an indication of the count value that will next be used to produce a byte of keystream that will be used to encrypt a subsequent block.

As an example, the count value may correspond to a 32-bit counter value that is used as an input to the encryption algorithm in order to produce a keystream of length equal to the block size of the cryptographic block cipher algorithm. Serial Decryptor 400 may be configured to count the number of bytes that are decrypted in order to determine if the count value should be incremented. For example, if 128-bits of keystream are produced by the block cipher for each instance of a count value, then Serial Decryptor 400 may be configured to use a given count value to decrypt 16 bytes of user ciphertext data. Upon decrypting the 16th byte of ciphertext data using keystream bytes generated using a given count value, Serial Decryptor 400 may be configured to increment the count value and use the incremented count value to produce additional bytes of keystream. For example, the incremented count value and nonce may be input to the block cipher with the secret key in order to generate the additional keystream data. As may be appreciated, although the updated count value is described herein as "incrementing" a counter, any predefined pattern or order may be used for the count values so long as the pattern and/or order is known to both the encryptor and decryptor. Additionally, in order to maintain cryptographic robustness for the ciphertext data during transmission over untrusted networks, a given count value used to generate a given keystream sequence should not be reused for generating a subsequent keystream sequence used to encrypt decrypt subsequent plaintext bytes with the same secret key. Reuse of the same count value and secret key may provide interceptors with additional information that can be used to attack the communication session.

However, although Serial Decryptor 400 may attempt to maintain a synchronized count value with a serial encryptor by counting the number of received ciphertext bits, due to conditions such as adverse channel conditions (e.g., for example if the communication channel includes an RF data link), some bytes encrypted and transmitted from the user device including the serial decryptor may not be received successfully at Serial Decryptor 400. Such unsuccessful data transmission may lead to de-synchronization between the count value used at the encryptor and the count value used at Serial Decryptor 400. If a different count value is used to generate the keystream used to encrypt a plaintext byte at the encryptor than is used to generate the keystream used to decrypt the corresponding ciphertext byte at the decryptor, Serial Decryptor 400 may be unable to successfully decrypt the data, leading to a communication failure.

In order to avoid de-synchronization between the encryptor and Serial Decryptor 400, intermittently framed cryptographic synchronization data may be opportunistically inserted into the ciphertext serial data stream. When Serial Decryptor 400 recognizes that byte(s) in the N-byte Shift Register 404 correspond to the escape sequence of the framed cryptographic synchronization message, rather than sending the data from the N-Byte Shift Register 404 to the Decrypt Module 408 for decryption, the data may be sent to Sync Data Processing Module 406.

Sync Data Processing Module 406 may be configured to validate and extract cryptographic synchronization data such as a count value from a framed cryptographic synchronization data message. For example, in addition to the escape sequence and indication of the synchronized count value, the framed cryptographic synchronization message may also include authentication field (e.g., a checksum byte(s), CRC, etc.) in order to allow Serial Decryptor 400 to determine whether the received bytes correspond to a valid framed cryptographic synchronization message. The checksum may be calculated across the count value alone or across the combination of the count value and the escape sequence.

As an example, Sync Data Processing Module 406 may receive a framed cryptographic synchronization message and determine that the framed cryptographic synchronization message does not correspond to ciphertext user data based on detection of the escape sequence. Sync Data Processing Module 406 may independently determine the checksum value, for example based on the received indication of the count value, in order to validate the checksum value included in the authentication field of the framed cryptographic synchronization message. The same checksum calculation as was used to generate the checksum byte(s) at the encryptor may also be used to re-calculate/verify the checksum byte(s) at the decryptor. For example, an eight-bit CRC such as the International Telegraph and Telephone Consultative Committee (CCITT) CRC-8 may be used to generate/verify the checksum byte(s), although various other checksum/CRC methods may be used. As an example, the CCITT CRC-8 may implement an $x^8+x^2+x+1$ polynomial function using an initial value of zero over the four byte count value in order to generate an eight-bit CRC.

If the checksum as determined by Sync Data Processing Module 406 matches the checksum value included in the authentication field of the framed cryptographic synchronization message, Sync Data Processing Module 406 may determine that the count value indicated by the framed cryptographic synchronization message is valid. Serial Decryptor 400 may determine that the verified count value is to be used for generating keystream data used to decrypt subsequently received ciphertext user data. The subsequently decrypted ciphertext data may be sent to Plaintext Data Sync 430, which may correspond to a user equipment device participating in the serial communication session. Any excess keystream data generated using previous count values may be discarded when a valid framed cryptographic synchronization message is received at Serial Decryptor 400 (e.g., CTR mode).

The use of a checksum or CRC may help prevent "talk-off" from occurring, where the escape sequence randomly occurs within the ciphertext data stream. In such a scenario, if a sequence of ciphertext data received by Serial Encryptor 400 corresponds to the same byte sequence as the escape sequence, then the probability of a subsequent byte of user data also corresponding to a correct calculation of the checksum within the ciphertext stream is extremely low or practically unachievable. Thus, the use of a checksum in the authentication field of the framed cryptographic synchronization message may prevent the decryptor from inadvertently interpreting the ciphertext data received with ciphertext data that happens to correspond to the escape sequence as a synchronized count value.

In an example, to prevent "false positives" at the decryptor (e.g., inadvertently determining that ciphertext corresponds to a framed cryptographic synchronization message based on an appearance of the escape sequence in the ciphertext data), the encryptor may be configured to ensure that the ciphertext output stream does not include any instances of the escape sequence. For example, suppose the American Standard Code for Information Interchange (ASCII) sequence "PQT" (e.g., hexadecimal representation 0x50, 0x51, 0x54) is used for the escape sequence of a framed cryptographic synchronization message. If the hexadecimal representation of "PQT" randomly occurs within ciphertext data to be transmitted, the encryptor may recognize that the ciphertext data corresponds to the escape sequence and may modify the ciphertext data prior to transmission. For example, the "PQT" ciphertext sequence may be changed to the ciphertext sequence "PQQT" by inserting an additional "Q" character (e.g., 0x51) into the ciphertext data sequence. The receiver at the decryptor—upon receiving the ciphertext sequence "PQQT"—may recognize that the "Q" symbol was inserted into the ciphertext data stream in order to distinguish the ciphertext data sequence from the escape sequence of a framed cryptographic synchronization message. The decryptor may be configured to remove the inserted symbol prior to decryption using the keystream. Such a technique to insert a symbol distinguishing ciphertext data from the escape sequence at the encryptor and the removal of the symbol at the decryptor may be referred to as elastic buffering or byte stuffing.

Figure 5:
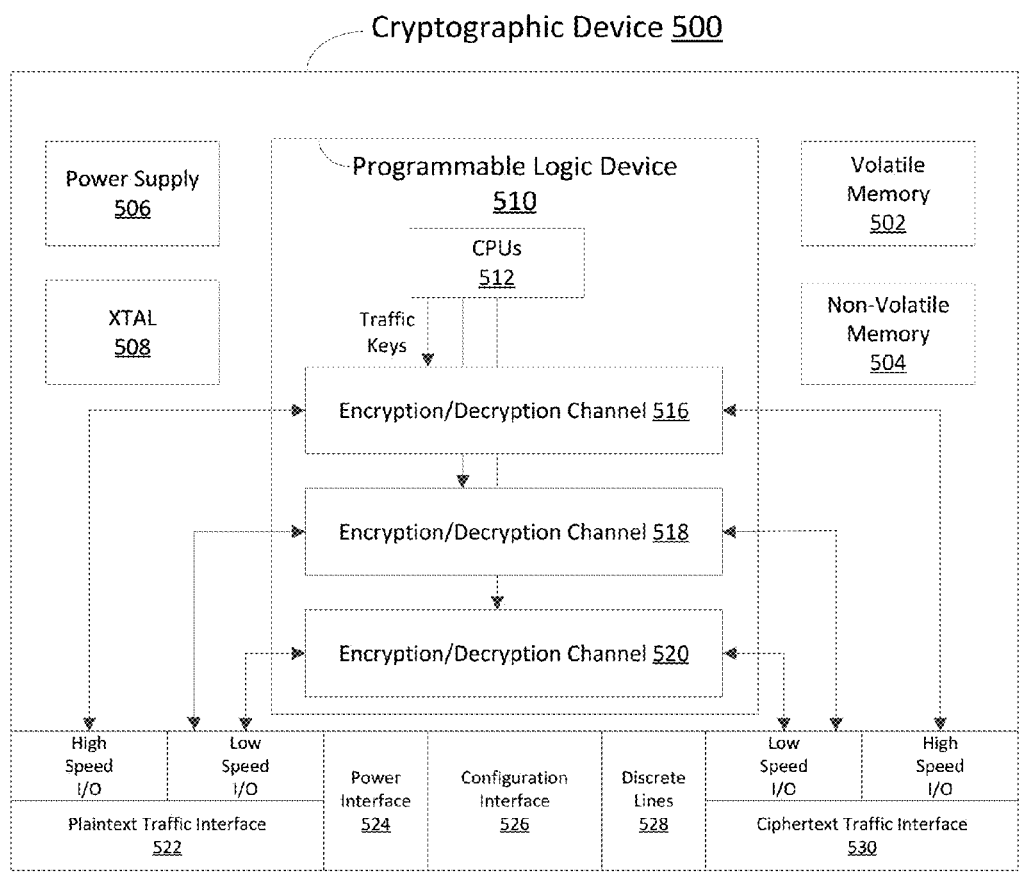
FIG. 5 is an example cryptographic module (e.g., for performing encryption and/or decryption).

FIG. 5 illustrates an example of a cryptographic device that may be configured to perform the encryption and/or decryption techniques described herein. As an example, Cryptographic Device 500 may be implemented as a CompactFlash form factor device. For example, Cryptographic Device 500 may be implemented using a low-power, FPGA configured to perform various cryptographic functions including the transmission and/or reception of framed cryptographic synchronization messages. For example, Cryptographic Device 500 may include Programmable Logic Device 510 (e.g., FPGA) that may be configured as one or more Central Processing Unit(s) 512. Central Processing Unit(s) 512 may be configured to perform one or more encryption and/or decryption functions. If a programmable logic device/FPGA is used to construct Cryptographic Device 500, the FPGA may designed to be relatively low power and may, for example, contain a soft-core ARM processor for CPUs 512 (e.g., or an equivalent application specific integrated circuit (ASIC)). Cryptographic Device 500 may be configured to provide traffic throughput of 10 Mb/sec or more at sub-300 mW power consumption. Child Cryptographic Device 500 may be constructed using a CompactFlash 50-pin package (e.g., or similar) and may weigh less than 20 grams.

Cryptographic Device 500 may include Non-Volatile Memory 504 and/or Volatile Memory 502 (e.g., for example configured from Programmable Logic Device 510) that may be used for storing configuration data for encryption/decryption (e.g., secret keys, bytes of keystream, counter values, etc.) and/or logic for performing one or more functions described herein.

In an example, in order to attempt to prevent sensitive information stored on Cryptographic Device 500 from being improperly copied, Cryptographic Device 500 may be configured with one or more anti-tampering functions. For example, Cryptographic Device 500 may be configured to zeroize and/or otherwise clear its memory (e.g., one or more of Non-Volatile Memory 504, Volatile Memory 502, Programmable Logic Device 510, etc.) if Cryptographic Device 500 is not powered for a predetermined period of time. For example, Power Supply 506 may include one or more hold-up capacitors and/or batteries that may be configured to provide a predetermined amount of energy for Cryptographic Device 500.

When Cryptographic Device 500 is not connected to an external power source, Cryptographic Device 500 may use Power Supply 506 as an energy source for powering Volatile Memory 502. Volatile Memory 502 may be used to store sensitive data such as one or more cryptographic secret keys and/or one or more encryption/decryption algorithms. If a predetermined amount of time passes during which Cryptographic Device 500 is drawing power from Power Supply 506 (e.g., and not an external power source), H Power Supply 506 may discharge the entirety of its stored energy, causing a loss of power to Volatile Memory 502 (e.g., and/or other components of Cryptographic Device 500). As a result, the contents of Volatile Memory 502 may be cleared or erased. In this manner, any sensitive data stored on Cryptographic Device 500 may be erased if Cryptographic Device 500 is not powered using an external power source for more than a predetermined length of time. The parameters of Power Supply 506 may be selected such that Volatile Memory 502 may be maintained for a chosen or selected amount of time without Cryptographic Device 500 being connected to an external power source.

Cryptographic Device 500 may include one or more interfaces for operably connecting to serial communication equipment. For example, Cryptographic Device 500 may be configured in such a manner so as to be essentially transparent to devices involved in the serial communication session. In order to maintain relative transparency, Cryptographic Device 500 may include interfaces for sending/receiving plaintext and/or ciphertext serial data. As an example, Cryptographic Device 500 may be configured to be inserted into a serial communication link at a first user equipment such as a radio at a UAV and a corresponding second Cryptographic Device 500 may be inserted on the serial communication link at a second radio, for example at a ground station. The user equipment/radios may be unaware that Cryptographic Device(s) 500 have been inserted on the serial link. Thus, in an example the serial communication devices may not need to be specially configured in order to operate with Cryptographic Device 500, instead simply receiving and/or sending serial data to Communication Device 500 in the same manner as it would transmit data over a traditional serial bus. However, in other example, the radios or communication equipment may also be modified in order to directly interface to Cryptographic Device 500 and/or to include Cryptographic Device 500.

In an example, Cryptographic Device 500 may include various interfaces for being configured by a parent cryptographic device. For example, Cryptographic Device 500 may be an example of a child cryptographic device that is configured to perform data-plane cryptographic functions while a parent cryptographic device that includes a full control-plane for the cryptographic configuration may be adapted to interface and configure Cryptographic Device 500. For example, Cryptographic Device 500 may include Configuration Interface 526, which may be used for interfacing with the parent cryptographic device in order to configure Cryptographic Device 500 with one or more cryptographic secret keys and/or one or more cryptographic algorithms.

Cryptographic Device 500 may include Power Interface 524. When connected to a host serial communication system for performing encryption/decryption, Cryptographic Device 500 may draw power using Power Interface 524. Cryptographic Device 500 may include Plaintext Traffic Interface 522 and/or Ciphertext Traffic Interface 530 for communicating unencrypted and/or encrypted data, respectively. For example, when interfacing with a host communication system that uses Cryptographic Device 500 for encryption/decryption, Child Cryptographic Device 500 may locally send and/or receive unencrypted plaintext data using Plaintext Traffic Interface 522. Similarly, encrypted ciphertext data and framed cryptographic synchronization data may be sent and/or received using Ciphertext Traffic Interface 530. Cryptographic Device 500 may also include Discrete Lines 528, which may include one or more electrical lines that are dedicated for communicating information for one or more discrete functions (e.g., rather than user data and/or other data streams). For example, Discrete Lines 528 may include an electrical line that is used to provide a zeroization signal (e.g., trigger Child Cryptographic Device 500 to clear memory and/or clear cryptographic keys). Discrete Lines 528 may include an electrical line that is used to indicate a status, for example to device an external status light emitting diode (LED) indicator.

Plaintext Traffic Interface 522 and Ciphertext Traffic Interface 530 may be serial communication interfaces. Each of Plaintext Traffic Interface 522 and Ciphertext Traffic Interface 530 may include one or more sub-interfaces, for example in order to communicate different types of serial data. For example, Plaintext Traffic Interface 522 and Ciphertext Traffic Interface 530 may each include a high speed input/output portion and a low speed input/output portion. For example, the high speed input/output portion may correspond to a USB serial line and the low speed input/output portion may correspond to a RS-232 serial line. Although two types of serial interfaces are shown for each of Plaintext Traffic Interface 522 and Ciphertext Traffic Interface 530 in FIG. 5 (e.g., high-speed and low-speed), depending on the types of communication systems interfacing to Cryptographic Device 500, Cryptographic Device 500 may be configured to implement one or a plurality of different serial communication channels.

For example, Encryption/Decryption Channel 516, Encryption/Decryption Channel 518, and Encryption/Decryption Channel 518 may be used to encrypt data received via Plaintext Traffic Interface 522 and/or decrypt data received from Ciphertext Traffic Interface 530. Encryption/Decryption Channel 516, Encryption/Decryption Channel 518, and Encryption/Decryption Channel 518 may be configured to use different types of block ciphering for encryption/decryption and/or to use different encryption parameters (e.g., secret keys, count values, etc.) for encryption/decryption. Encryption/Decryption Channel 516, Encryption/Decryption Channel 518, and Encryption/Decryption Channel 518 may each be configured for encrypting/decrypting traffic associated with different serial communication systems.

As an example, Encryption/Decryption Channel 516, Encryption/Decryption Channel 518, and Encryption/Decryption Channel 518 may be configured to process asynchronous user data bytes at rates up to 230 Kb/sec or higher and to communicate the encrypted user data and framed cryptographic synchronization data over radio, optical, and/or electrical data links via Ciphertext Traffic Interface 530. Cryptographic Device 500 may be configured to engage in a key agreement exchange (e.g., such as Diffie-Hellman) with a peer cryptographic device in order to cooperatively agree on a traffic key used to generate the keystream using the block cipher. However, various different key agreement approaches may be used and/or Cryptographic Device 500 may use or more pre-positioned key material, password implementations, etc.

FIG. 6 illustrates an example of how framed cryptographic synchronization data may be inserted into a ciphertext stream. For purposes of explanation and clarity, FIG. 6 will be described for a cryptographic system implementing an AES block cipher operating in CTR mode which utilizes a symmetrical encryption/decryption secret key. As may be appreciated, the techniques described herein may be equally applicable to other block cipher architectures/parameters. In the example shown in FIG. 6, the framed cryptographic synchronization message may include a three-byte escape sequence (e.g., ESC1, ESC2, ESC3), and four-byte cryptographic synchronization value (e.g., CS1, CS2, CS3, CS4), and a one-byte CRC checksum (e.g., CRC). Although a CRC byte is used for authentication for purposes of explanation in FIG. 6, other types and/or lengths of authentication fields may be used to validate and/or check for errors in a framed cryptographic synchronization message. Further, in FIG. 6

Ciphertext user data may be represented a "U#" where "#" represents the byte position of the ciphertext byte within the ciphertext serial stream.

The example shown in FIG. 6 illustrates a scenario where a six-byte serial user data message is received, followed by eight byte-times of idle time (e.g., no serial communications are sent/received during the asynchronous serial communication session), followed by a series including a six-byte serial user data message, a three-byte time idle period and a subsequent serial user data message. Since the first idle period (e.g., but not subsequent idle periods in this example) includes enough of a gap in user data transmissions to insert a framed cryptographic synchronization message, the encryptor includes the framed cryptographic synchronization message in the first idle period but not during idle periods that are less than eight bytes. This may be the case when user data traffic takes priority over cryptographic synchronization data, for example when the cryptographic encryption/decryption is meant to be substantially transparent to the devices involved in the serial communication session (e.g., the same relative timing between serial messages is maintained, although some delay may be introduced due to buffering and encryption/decryption).

For example, KS 602 may represent the different keystream bytes used to encrypt and/or decrypt a given serial data byte that is included in Rx 604. In an example, prior to the transmission of encrypted serial user data, an initialization message may be sent from the encryptor to the decryption. The initialization message may be a framed cryptographic synchronization message that unambiguously indicates the initial value of the counter used to generate the first string of keystream. For example, the eight-byte framed synchronization message [ESC1, ESC2, ESC3, CS1, CS2, CS3, CS4/1, CRC] may represent an initialization message that indicates the first value of the count for generating the keystream from the block cipher will be [CS1, CS2, CS3, CS4/1]. Using a predetermined secret key and count value [CS1, CS2, CS3, CS4/1] (e.g., perhaps with a nonce), the block cipher may output keystream byte sequence 1.1, 1.2, 1.3, 1.4, 1.5, 1.6, . . . , 1.16 (e.g., for example if AES CTR mode is used).

Upon establishing the initial count value, the encryptor may begin encrypting serial data bytes using the keystream generated based on the count. For example, FIG. 6 may demonstrate how serial user data bytes are encrypted at position RX 604 using the corresponding keystream byte indicated by KS 602. The encrypted serial byte may then be inserted into 8 Byte Shift Register 606, where it is shifted one byte position each byte time. Tx 608 may represent the serial ciphertext byte and/or byte of cryptographic synchronization data that is transmitted from the encryptor at a given byte-time.

For example, after transmission of the initialization framed cryptographic synchronization message, a $1^{st}$ user byte may be received from the serial communication channel. The $1^{st}$ user byte may be encrypted by XORing the $1^{st}$ user byte with keystream byte 1.1. The result may be a ciphertext byte represented as U1. At the next byte-time a $2^{nd}$ user byte of the first serial message may be received and the first ciphertext byte U1 may be stored in the first bit position of 8 Byte Shift Register 606. The $2^{nd}$ user byte may then be encrypted by XORing the $2^{nd}$ user byte with the second byte of keystream generated from the first exchanged count value (e.g., 1.2) to generate ciphertext byte U2. When the $3^{rd}$ user byte arrives at Rx 604, the first ciphertext byte U1 may be shifted to the second byte potion of 8 Byte Shift Register 606, and the second ciphertext byte U2 may be stored in the first byte position. Such a process may be repeated for each of the user bytes received over the subsequent byte times, and the contents of 8 Byte Shift Register 606 may be shifted each byte time. The contents of 8 Byte Shift Register 606 that occupy byte-position 8 may be sent to Tx 608 for transmission upon shifting the contents of byte-position 7 to byte-position 8. Such a transmission pattern may be represented in FIG. 6 by each row representing a subsequent byte time as you move from the first row at the top of the page to the last row on the bottom of the page.

In the example of FIG. 6, the user serial message may include six bytes of data. After receiving the six bytes of data, the serial line may be idle for eight byte-times. The serial encryptor may be configured to use 8 Byte Shift Register 606 in order to determine that there is enough idle time in order to opportunistically insert a framed cryptographic synchronization message. For example, upon detecting an $8^{th}$ consecutive idle byte, the encryptor may be configured to insert a framed cryptographic synchronization message into the ciphertext stream. In this example, the framed cryptographic synchronization message may be represented by the sequence [ESC1, ESC2, ESC3, CS1, CS2, CS3, CS4/2, CRC]. The escape sequence of the framed cryptographic message (e.g., ESC1, ESC2, ESC3) and the checksum byte (e.g., CRC) may unambiguously indicate to the decryptor that the bytes correspond to a framed cryptographic synchronization message and that the new count value used for subsequent encryption/decryption operations is [CS1, CS2, CS3, CS4/2]. Both the encryptor and decryptor may use the new count value to generate subsequent keystream values. For example, using the predetermined secret key and the updated count value [CS1, CS2, CS3, CS4/2] (e.g., perhaps with the nonce), the block cipher may output keystream byte sequence 2.1, 2.2, 2.3, 2.4, 2.5, 2.6, . . . , 2.16 (e.g., for example if AES CTR mode is used). These new keystream values may be used to encrypt/decrypt serial bytes after transmission of the framed cryptographic synchronization message that includes count value [CS1, CS2, CS3, CS4/2]. If excess keystream remains when a subsequent framed cryptographic synchronization message is received (e.g., keystream bytes 1.7, 1.8, . . . , 1.16 had not yet been used when the framed cryptographic synchronization message changing the count to [CS1, CS2, CS3, CS4/2] was received) any excess keystream bytes from the previous count may be discarded.

If the idle time between serial messages is less than the time used to transmit a framed cryptographic synchronization message, then the framed cryptographic synchronization message may not be inserted into the ciphertext stream. In an example where the encryption/decryption operations are meant to be transparent to the devices communicating in the serial communication session, the same relative timing between serial messages may be maintained. For example, if a first user message includes six user bytes, followed by three byte-times of idle, followed by six additional bytes of user data (e.g., as shown in FIG. 6 after transmission of the second framed synchronization message [ESC1, ESC2, ESC3, CS1, CS2, CS3, CS4/2, CRC]), the decryptor may determine not to insert a framed cryptographic synchronization message into the ciphertext stream as doing so would disrupt the relative time of the user data messages.

If insufficient idle time between user data bytes is provided before the keystream generated by a given count value has been completed used to encrypt a series of user data bytes (e.g., 16 bytes of keystream in the example shown in FIG. 6 where AES in CTR mode is used) then both the encryptor and decryptor may independently determine that the count should be incremented in order to generate additional keystream. The implicit determination to increment the count may be based on a determination that each of the available bytes of keystream has been used to encrypt/decrypt a byte of user data. Thus, as shown in FIG. 6, when a $17^{th}$ byte of user data is provided to Rx 604 without a subsequent update of the count value, the encryptor may implicitly determine to increment the count in order to generate additional keystream bytes (e.g., KS 3.1, 3.2, 3.3, . . . , 3.16). The decryptor may also implicitly determine to increment the count and generate additional keystream based on using each of keystream bytes 2.1, 2.2, 2.3, . . . , 2.16 to decrypt ciphertext data bytes. Although such implicit determinations to increment the count may result in error-free transmissions in ideal scenarios, the presence of bit errors and other transmission inaccuracies may result in de-synchronization between the count values used at the encryptor and decryptor, as not all of the encrypted bytes may be successfully received.

To prevent such de-synchronization, the encryptor may be configured to insert a framed cryptographic synchronization message into the ciphertext serial stream any time sufficient space/time is available after the transmission of encrypted user data. Thus, once given keystream bytes generated from a given count value have been used to encrypt a transmitted serial message, if N idle byte-times are detected (where N may be the size of the framed cryptographic synchronization message), the encryptor may be configured to update the count value and transmit the framed cryptographic synchronization message indicating the new count value during the idle time. By sending an updated block counter value as frequently as permitted by the idle periods, the encryption may remain substantially transparent to the serial devices (e.g., the same relative timing between messages is maintained although a delay may be introduced) while still maintaining robustness for handling scenarios where ciphertext messages are lost due to channel conditions such as radio interference, etc.

The serial data to be transmitted may include messages of various lengths. For example, if message length is greater than the size of the keystream generated by a given count value, the encryptor may be unable to send a framed cryptographic synchronization message prior to incrementing the counter to generate additional keystream data. In this case the decryptor may increment its block counter independently by counting received CT bytes as the serial link may maintain the bytes in the same order that they were transmitted. When sufficient time for generating and sending a framed cryptographic synchronization message is available after transmission of the longer message, the encryptor/decryptor can re-synchronize the count values in case there were any transmission errors while the previous count value(s) were being used.

Typically, the decryptor may be configured to refrain from outputting received plaintext until it has received a valid framed cryptographic synchronization message. This is because that although it is possible that both the sender and receiver started out in-sync, in many practical scenarios this not the usual case. Thus an initialization framed cryptographic synchronization message may be used in order to avoid outputting plaintext noise at startup at the decryptor.

Additional buffering of user data and ciphertext not described above may be performed in order to avoid race conditions within the cryptographic module. For example, the cryptographic module may be configured to refrain from performing decryption of a first received ciphertext byte after a received framed cryptographic synchronization message while the updated count value is being used to generate the correct keystream from the block cipher. After the keystream has been generated, the decryption may be performed.

Further, although examples have been described for asynchronous serial data transmissions, the techniques and devices described herein may be equally applicable to encrypting/decrypting synchronous serial data. For example, the framed cryptographic synchronization messages may be inserted into synchronous serial data streams at predetermined times that are sufficiently long to accommodate the length of the framed cryptographic synchronization message. Rather than or in addition to using predetermined times for inserting the framed cryptographic synchronization data into a synchronous serial stream, opportunistic transmission opportunities may be used for transmitting the framed cryptographic synchronization message into the synchronous data (e.g., based on observed idle times).

Further, if maintaining the same relative timing between serial messages is not necessary or desired, the encryptor may be configured to shift the relative timing of one or more serial bytes in order to accommodate the transmission of a framed cryptographic synchronization message. For example, if the framed cryptographic synchronization message is eight bytes long and the encryptor detects seven consecutive idle bytes followed by two (as an example) user bytes followed by two or more idle bytes, one or more of the bytes to be encrypted may be shifted in transmission time in order to accommodate the transmission of the eight-byte framed cryptographic synchronization message. For example, the two data bytes may be delayed by a byte-time such that the framed cryptographic synchronization message may be sent prior to their transmission. The two user bytes may then be encrypted using the keystream generated from the updated count value indicated in the framed cryptographic synchronization message and transmitted. In another example, rather than delaying the transmission of the two bytes, they may be transmitted "early" (e.g., immediately after the previous string of bytes) such that the framed cryptographic synchronization message can be sent after they have been transmitted. Whether to shift given data bytes forward or backwards for transmission before or after a framed synchronization message may be determined based on the relative timing of the idle periods, the desired latency for the data, and/or the like.

In order to accommodate the shifting of transmission times for user data bytes while still determining when sufficient idle time has occurred for transmission of a framed cryptographic synchronization message, the size of the shift register can be increased. For example, rather than using a shift register of length equal to the length of the framed cryptographic synchronization message, a larger shift register may be used in order to allow the relative timing of serial bytes to be changed in order to generate sufficient consecutive idle time for generating a framed cryptographic synchronization message. For example, if the shift register size is increased to 16 bytes, then if at least eight bytes of idle time occur in any order over a period of 16 consecutive byte-times (e.g., assuming an eight-byte framed cryptographic synchronization message length), then the relative timing of the bytes may be altered in such a way as to accommodate transmission of a framed cryptographic synchronization message.

Figure 7A:
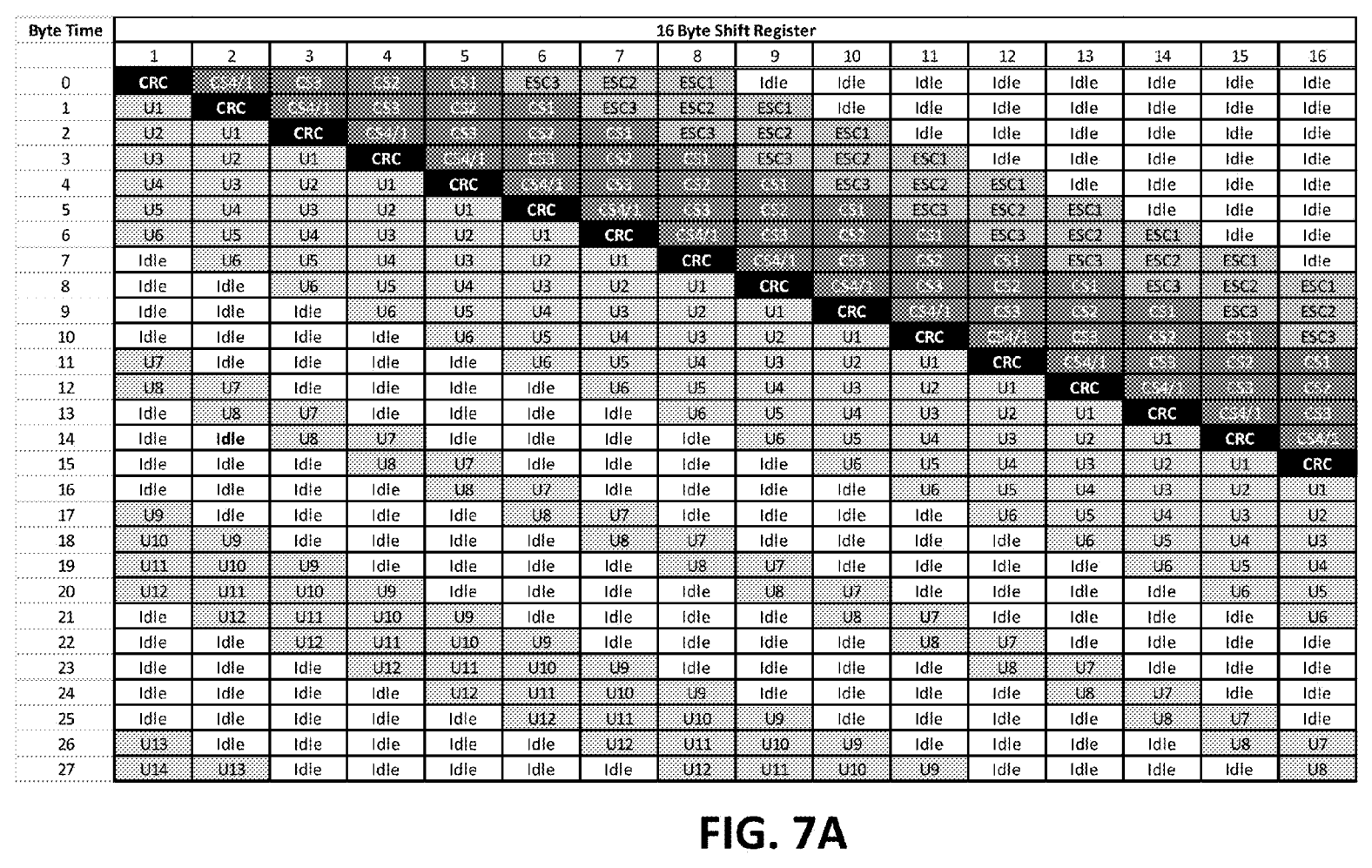
Figure 7B:
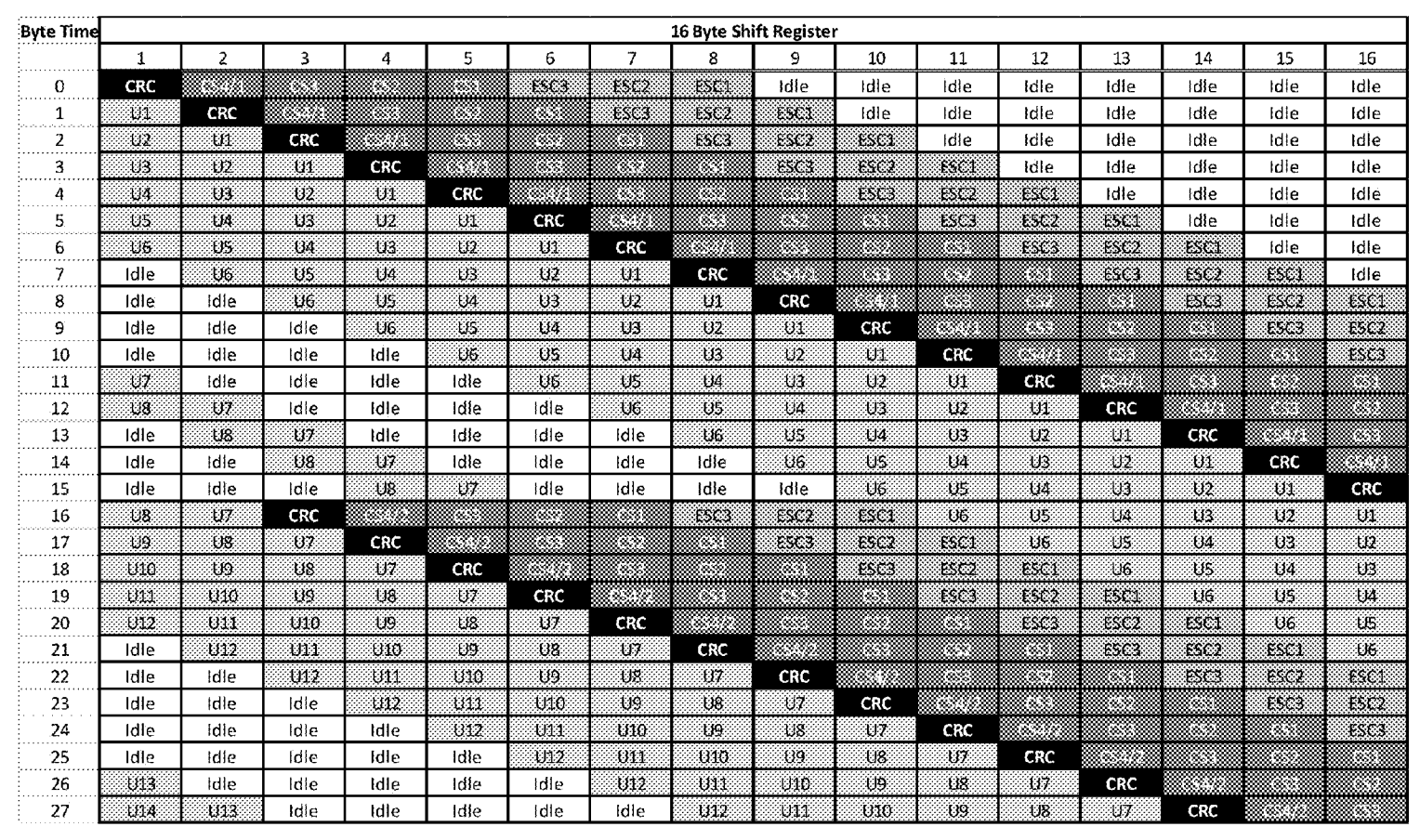
Figure 7C:
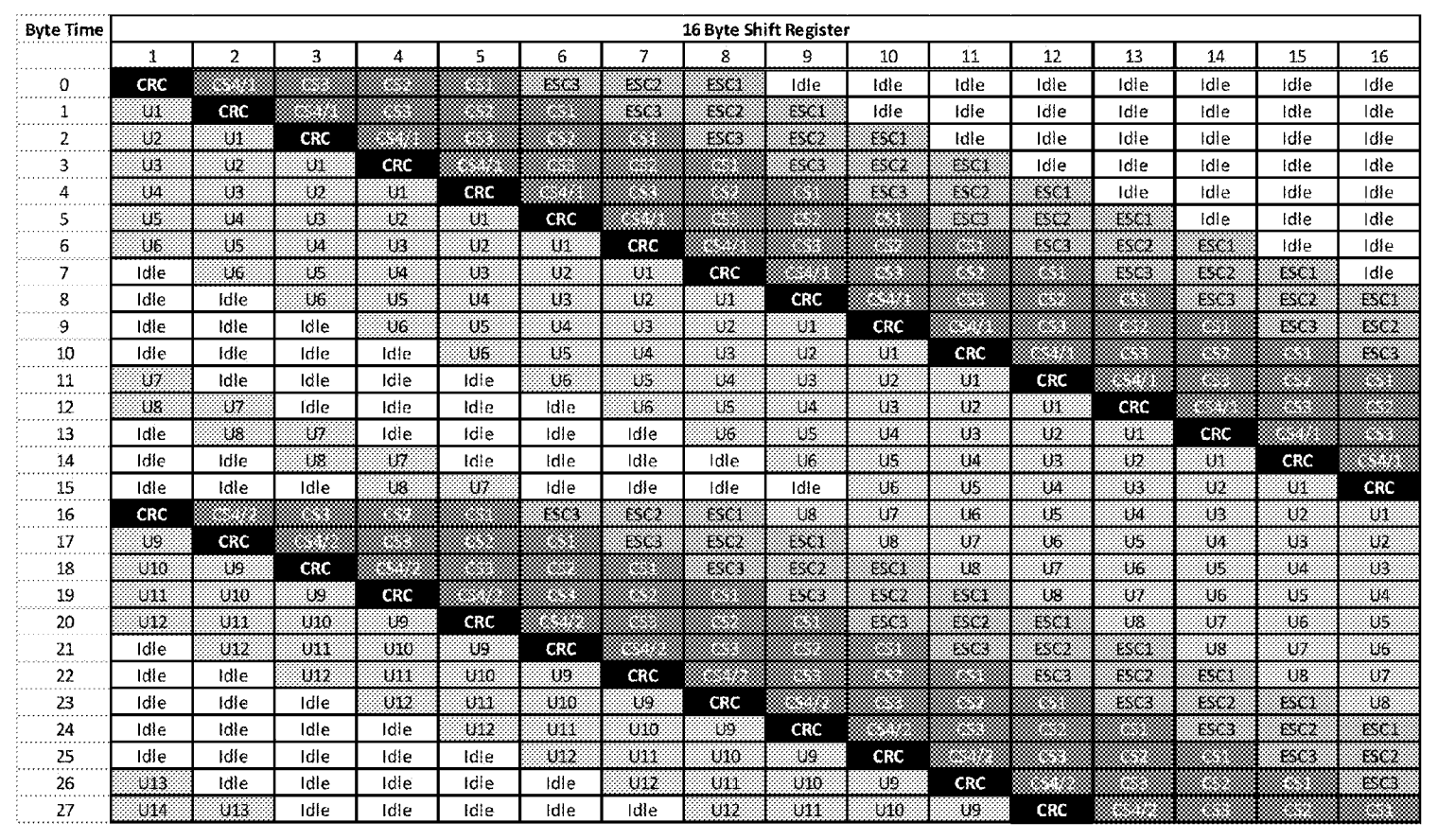

As an example, FIGS. 7A, 7B, & 7C illustrate examples of how user data bytes may be shifted in order to accommodate the transmission of a framed cryptographic synchronization message in a scenario where the same relative timing of user data transmissions does not have to be maintained. For example, although such techniques may cause the encryption/decryption process to become non-transparent to the devices involved in the serial data session (e.g., in addition to introducing constant processing delays the buffering technique also changes the relative time between user data bytes), such a system may be able to transmit the framed cryptographic synchronization messages more frequently, which may provide for more robust error protection, for example in conditions where the channel quality is degrading.

FIG. 7A illustrates the case where user data bytes are not shifted in order to accommodate a framed cryptographic synchronization message. For example, after transmission of an initialization frame cryptographic synchronization message, the encryptor may receive user data bytes U1-U6 in consecutive byte times. Following reception of the six user data bytes, the serial transmitter may then be idle for four byte-times. After the four-byte idle time, two additional use data bytes (e.g., U7, U8) may be received, followed by four additional idle bytes. The second idle period may be followed by four more user data bytes (e.g., U9, U10, U11, U12). Before eight consecutive idle bytes are received at the encryptor (e.g., the length of the framed cryptographic synchronization message), more user data bytes are received. If such a condition occurs where eight consecutive idle times does not occur for a prolonged period, the encryptor and decryptor may become increasingly susceptible to become out-of-sync due to one or more ciphertext bytes being lost during transmission (e.g., resulting in the count values and/or keystream bytes at the encryptor and decryptor to become mismatched).

FIG. 7B illustrates as similar transmission scenario as shown in FIG. 7A, although in this example the encryptor shifts the transmission of user data bytes U7 and U8 backwards in time in order to first transmit a framed cryptographic synchronization message. For example, the user serial bytes to be transmitted and encrypted by the encryptor may be received in the same order as was described for FIG. 7A. However, rather than maintaining the same relative timing between serial bytes to be transmitted, upon detecting the eighth byte time that would have been idle (e.g., in the example shown in FIG. 7B at byte time 16), the location of the user serial bytes may be shifted within the shift register in order to accommodate a framed cryptographic synchronization message. For example, at byte time 16, the encryptor may detect the eighth idle byte. The user data bytes U7 and U8 may then be shifted 4 byte times back to shift register byte positions 1 and 2. As a result, a framed cryptographic synchronization message may now be inserted in the shift register at byte positions 3-10. The framed cryptographic synchronization message may indicate that subsequent bytes will be encrypted using keystream generated based on the count value [CS1, CS2, CS3, CS4/2]. User data bytes U7-U14 may be encrypted using the keystream generated from the updated count. In order to allow the user data bytes to be delayed such that they are to be encrypted with an updated count, rather than encrypting the user data bytes prior to insertion the shift register, the encryption may be performed upon egress from the shift register (e.g., so that bytes U7 and U8 do not have to be re-encrypted using keystream bytes generated from the updated count after determining that a framed cryptographic synchronization frame should be inserted).

FIG. 7C illustrates a similar example, although rather than delaying the transmission of user bytes U7 and U8, the transmission times of bytes U7 and U8 are shifted to an earlier time period in order to accommodate a framed cryptographic synchronization message (e.g., thus U7 and U8 are encrypted using the keystream generated from the older count value). For example, as shown in FIG. 7C, when the encryptor detects the eighth byte of idle time at byte time 16, user data bits U7 and U8 may be shifted to byte positions 9 and 10 in order to allow a framed cryptographic synchronization message to be inserted as byte positions 1-8. As a result of moving up the transmission times for user bytes U7 and U8 rather than delaying them until after transmission of the framed cryptographic synchronization message, encryption can still be performed prior to insertion into the shift register and user bytes U7 and U8 do not have to be re-encrypted using keystream generated from an updated count value. Although the ability to shift the relative timing of user data bytes prior to transmission may result in the use of a larger register/buffer size (e.g., increasing the overall processing delay) such techniques may provide more robustness for periods where channel conditions are degrading or degraded, as the encryptor and decryptor may be re-synchronized more often.

In an example, the decryptor may be configured to continually aggregate idle times until a sufficient idle time for transmitting a framed cryptographic synchronization message has been reserved. In this manner, the framed cryptographic synchronization message may be transmitted at the first opportunity given the idle times provide on the serial line.

In an example, the size of the shift register may be adjusted dynamically in order to accumulate in order to insert a cryptographic related message of any given length provide the serial user equipment can tolerate the delays introduced from the buffering. For example, in some scenarios it may be desirable to exchange encrypted versions of the secret traffic keys over the communication channel. In order to do so, similar techniques as were used for opportunistically transmitting framed cryptographic synchronization data may also be used for transmitting the cryptographic-relate key data.

For example, if the key length is 128-bits, then the encryptor may be configured to monitor the idle time in order to determine if sufficient consecutive idle periods have occurred in order to allow the key to be inserted in the serial stream. As an example, a second three-byte escape sequence may be used to unambiguously indicate to the decryptor that the bytes following the escape sequence correspond to cryptographic-related data that is not cryptographic synchronization data. For example, the escape sequence "PQX" (e.g., hexadecimal representation 0x50, 0x51, 0x58) may be used to indicate that the "body" of the framed cryptographic control message corresponds to the encrypted version of the traffic key. The 16 bytes immediately following the escape message may be used to transmit the encrypted version of the key. A checksum (e.g., a one or more byte CRC) may be appended to the framed cryptographic control message to prevent errors and may be included in an authentication field.

Other types of cryptographic control messages may be inserted into the serial stream in a similar manner Different escape sequence values may be used to indicate different types of cryptographic control messages. In this manner, although a framed structure is introduced for the transmission of cryptographic control messages such as synchronization messages and/or key exchange messages, user data bytes may remain unframed.

Embodiments may take the form of a tangible computer-usable or computer-readable medium providing program code for use by or in connection with a computer or any instruction execution system. Examples of a computer-usable or computer-readable medium include tangible computer media such as semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. A processor may be configured to execute instructions stored in memory to perform the various functions described herein.

Although the concepts and structures disclosed herein have been described with reference to several examples and exemplary embodiments, numerous modifications and variations may be made and still be within the scope described herein. No limitation with respect to any specific example or embodiment is intended to be necessary or mandatory, and the scope of the protection should be plainly apparent based on the language of the following claims.

What is claimed:

1. An encryption device comprising:
   a first communication interface configured to receive a serial data stream;
   a processor configured to:
   generate a keystream using a block cipher operating in counter mode, wherein the keystream is generated based on at least a key value and a count value,
   encrypt the serial data stream using the keystream,
   detect an idle period in the serial data stream,
   insert a framed cryptographic synchronization message into the encrypted serial data stream at a position corresponding to the detected idle period, wherein the framed cryptographic synchronization message comprises an escape sequence and an indication of a count value to be used to generate keystream data; and
   a second communication interface configured to output the encrypted serial data and the framed cryptographic synchronization message.

2. The encryption device as in claim 1, wherein data framing information is not added to the serial data stream in order to encrypt the serial data stream using the keystream generated using the block cipher.

3. The encryption device as in claim 1, wherein the processor is configured to:
   determine that the idle period in the serial data stream is sufficiently large to accommodate the framed cryptographic synchronization message.

4. The encryption device as in claim 1, wherein at least the processor is further configured to:
   maintain a shift register with a length that is greater than or equal to a length of the framed cryptographic synchronization message;
   cycle units of the encrypted serial data stream through the shift register; and
   determine to insert the framed cryptographic synchronization message into the encrypted serial data stream based on the shift register having sufficient space available for the framed cryptographic synchronization message due to the idle period in the encrypted serial data stream.

5. The encryption device as in claim 1, wherein at least the processor is further configured to adjust the relative timing of one or more portions of the encrypted serial data stream in order to accommodate insertion of a second framed cryptographic synchronization message.

6. The encryption device as in claim 1, wherein at least the processor is configured to maintain a relative timing of data within the serial data stream when encrypting the serial data stream and when inserting the framed cryptographic synchronization message.

7. The encryption device as in claim 1, wherein the framed cryptographic synchronization message further comprises an authentication field, and a value of the authentication field is determined based on the indication of the count value included in the framed cryptographic synchronization message.

8. The encryption device as in claim 1, wherein the processor is configured to insert an instance of framed cryptographic synchronization data into the encrypted serial data stream at the first opportunity where:
   sufficient idle space is available in the encrypted serial data stream to accommodate the instance of the frame cryptographic synchronization data; and
   keystream data generated from a preceding count value was used to encrypt data.

9. The encryption device as in claim 1, wherein the processor is further configured to ensure that the escape sequence does not occur in the encrypted serial data stream unless the escape sequence is indicating the presence of a given framed cryptographic synchronization message.

10. A decryption device comprising:
    a first communication interface configured to receive an encrypted serial data stream, wherein one or more instances of a framed cryptographic synchronization message is included within the encrypted serial data stream;
    a processor configured to:
    detect an escape sequence comprised in a first framed cryptographic synchronization message within the encrypted serial data stream,
    determine a count value comprised in the first framed cryptographic synchronization message based on detecting the escape sequence, wherein the first framed cryptographic synchronization message is inserted in the encrypted serial data stream at a position that corresponds to an idle period,
    generate a keystream using a block cipher operating in counter mode, wherein the keystream is generated based on at least a key value and the count value,
    decrypt at least a portion of the encrypted serial data stream using the keystream; and
    a second communication interface configured to output an unencrypted serial data stream that corresponds to at least the portion of the encrypted serial data stream.

11. The decryption device as in claim 10, wherein the wherein the block cipher is configured to implement the Advanced Encryption Standard (AES) and the keystream is generated based further on a nonce value.

12. The decryption device as in claim 10, wherein the first framed cryptographic synchronization message further comprises an authentication field that includes at least one of a checksum or a cyclic redundancy check (CRC).

13. The decryption device as in claim 12, wherein the processor is further configured to validate the first framed cryptographic synchronization message based on at least one of the checksum or the CRC.

14. The decryption device as in claim 10, wherein the processor is configured to decrypt the portion of the encrypted serial data stream using the keystream by XORing the portion of the encrypted serial data stream with data from the keystream.

15. The decryption device as in claim 10, wherein the decryption device is implemented on a field programmable gate array (FPGA).

16. The decryption device as in claim 15, wherein the decryption device is configured to provide a traffic throughput of at least 10 Mb/sec while consuming 300 mW or less power and while weighing 20 grams or less.

17. The decryption device as in claim 10, wherein the processor is further configured to:
  determine that all of the keystream data generated based on a given count value has been used to decrypt data;
  increment the count value based on determining that all of the keystream data generated based on the given count value has been used to decrypt data;
  generate additional keystream data using the block cipher based on the key value and the incremented count value; and
  decrypt subsequent serial data based using the additional keystream.

18. A method for using block ciphering techniques to cryptographically protect serial data, the method comprising:
  receiving a first serial data stream via a first communication interface;
  generating a first keystream using the block cipher operating in counter mode, wherein the keystream is generated based on at least a first key value and a first count value;
  encrypting the first serial data stream using the keystream to produce a first encrypted serial data stream;
  detecting an idle period in the serial data stream;
  inserting a first framed cryptographic synchronization message into the first encrypted serial data stream at a position corresponding to the detected idle period, wherein the first framed cryptographic synchronization message comprises a first escape sequence and an indication of a first count value to be used to generate keystream data; and
  outputting the first encrypted serial data and the first framed cryptographic synchronization message via a second communication interface.

19. The method as in claim 18, further comprising:
  receiving a second encrypted serial data stream, wherein a second framed cryptographic synchronization message is included within the second encrypted serial data stream;
  detecting the escape sequence within the second encrypted serial data stream;
  determining a second count value comprised in the encrypted serial data stream based on detecting the escape sequence;
  generating a second keystream using the block cipher operating in counter mode, wherein the second keystream is generated based on at least a second key value and the second count value;
  decrypting at least a portion of the second encrypted serial data stream using the second keystream; and
  outputting a second serial data stream that corresponds to at least the portion of the second encrypted serial data stream.

20. The method as in claim 19, wherein the block cipher is configure to implement the Advanced Encryption Standard and each of the first serial data stream and the second serial data stream are asynchronous serial data streams.

* * * * *